United States Patent
Caparso et al.

(10) Patent No.: US 12,484,962 B2
(45) Date of Patent: Dec. 2, 2025

(54) SYSTEMS AND METHODS OF DENERVATION AROUND SUBCLAVIAN ARTERIES

(71) Applicant: Artha Partners B.V., Leiden (NL)

(72) Inventors: Anthony Vincent Caparso, North Ridgeville, OH (US); Arun Sridhar, Milton Keynes (GB)

(73) Assignee: Artha Partners B.V., Leiden (NL)

(*) Notice: Subject to any disclaimer, the term of this patent is extended or adjusted under 35 U.S.C. 154(b) by 0 days.

(21) Appl. No.: 18/879,966

(22) PCT Filed: Jun. 29, 2023

(86) PCT No.: PCT/US2023/026620
§ 371 (c)(1),
(2) Date: Dec. 30, 2024

(87) PCT Pub. No.: WO2024/006466
PCT Pub. Date: Jan. 4, 2024

(65) Prior Publication Data
US 2025/0160940 A1    May 22, 2025

Related U.S. Application Data

(60) Provisional application No. 63/430,614, filed on Dec. 6, 2022, provisional application No. 63/367,578, filed on Jul. 1, 2022.

(51) Int. Cl.
*A61B 18/14*    (2006.01)
*A61B 18/00*    (2006.01)
*A61B 18/02*    (2006.01)

(52) U.S. Cl.
CPC .............. *A61B 18/1492* (2013.01); *A61B 2018/00345* (2013.01); *A61B 2018/00434* (2013.01);
(Continued)

(58) Field of Classification Search
CPC ...... A61B 18/1492; A61B 2018/00345; A61B 2018/00434; A61B 2018/00577; A61B 2018/0212
See application file for complete search history.

(56) References Cited

U.S. PATENT DOCUMENTS

| 5,203,326 A | 4/1993 | Collins |
| 6,164,283 A | 12/2000 | Lesh |

(Continued)

FOREIGN PATENT DOCUMENTS

| EP | 3238646 A2 | 11/2017 |
| WO | WO 2024/006466 A1 | 1/2024 |
| WO | WO 2025/144924 A1 | 7/2025 |

OTHER PUBLICATIONS

International Search Report and Written Opinion issued in PCT Application No. PCT/US2023/026620, mailed Dec. 7, 2023, in 19 pages.

(Continued)

*Primary Examiner* — Thomas A Giuliani
*Assistant Examiner* — Christine A Dedoulis
(74) *Attorney, Agent, or Firm* — Knobbe Martens Olson and Bear, LLP

(57) ABSTRACT

A method of treating heart disease in a subject includes percutaneously introducing a catheter into vasculature of the subject. The catheter may include a neuromodulation element. The neuromodulation element may be positioned on an expansion element. The neuromodulation element of the catheter can be positioned in a subclavian artery of the subject. The catheter can be used to electrically stimulate at least one of a dorsal subclavian ansae or a ventral subclavian ansae. The method can include confirming stimulation of the dorsal subclavian ansae and/or the ventral subclavian ansae by monitoring a cardiac parameter. After confirming stimulation of the dorsal subclavian ansae and/or the ventral (Continued)

subclavian ansae, ablation energy can be provided to the dorsal subclavian ansae and/or the ventral subclavian ansae.

13 Claims, 12 Drawing Sheets

(52) U.S. Cl.
CPC ............... *A61B 2018/00577* (2013.01); *A61B 2018/0212* (2013.01)

(56) References Cited

U.S. PATENT DOCUMENTS

| | | | |
|---|---|---|---|
| 6,292,695 | B1 | 9/2001 | Webster, Jr. et al. |
| 6,487,446 | B1 | 11/2002 | Hill et al. |
| 6,532,388 | B1 | 3/2003 | Hill et al. |
| 6,564,096 | B2 | 5/2003 | Mest |
| 6,937,896 | B1 | 8/2005 | Kroll |
| 7,123,961 | B1 | 10/2006 | Kroll et al. |
| 7,139,607 | B1 | 11/2006 | Shelchuk |
| 7,142,917 | B2 | 11/2006 | Fukui |
| 7,225,017 | B1 | 5/2007 | Shelchuk |
| 7,245,967 | B1 | 7/2007 | Shelchuk |
| 7,277,761 | B2 | 10/2007 | Shelchuk |
| 7,305,265 | B2 | 12/2007 | Fukui |
| 8,386,053 | B2 * | 2/2013 | Kornet ............... A61N 1/36114 607/116 |
| 9,480,790 | B2 | 11/2016 | Machado et al. |
| 10,172,549 | B2 | 1/2019 | Waldhauser et al. |
| 10,188,343 | B2 | 1/2019 | Goedeke et al. |
| 2003/0100924 | A1 | 5/2003 | Foreman et al. |
| 2003/0216792 | A1 | 11/2003 | Levin et al. |
| 2004/0138713 | A1 | 7/2004 | Stickney et al. |
| 2005/0149148 | A1 | 7/2005 | King |
| 2005/0288730 | A1 | 12/2005 | Deem et al. |
| 2007/0100380 | A1 | 5/2007 | Fukui |
| 2007/0191895 | A1 | 8/2007 | Foreman et al. |
| 2007/0299476 | A1 | 12/2007 | Park et al. |
| 2008/0021503 | A1 | 1/2008 | Whitehurst et al. |
| 2008/0051839 | A1 | 2/2008 | Libbus et al. |
| 2008/0119907 | A1 | 5/2008 | Stahmann |
| 2010/0114254 | A1 | 5/2010 | Kornet |
| 2012/0071870 | A1 | 3/2012 | Salahieh et al. |
| 2015/0119790 | A1 | 4/2015 | Moffitt et al. |
| 2016/0175041 | A1 | 6/2016 | Govari et al. |
| 2016/0317621 | A1 | 11/2016 | Bright |
| 2019/0184172 | A1 | 6/2019 | Ardell et al. |
| 2020/0214635 | A1 | 7/2020 | Dahlen et al. |
| 2021/0001116 | A1 * | 1/2021 | Waldhauser ........... A61B 34/25 |
| 2021/0069504 | A1 | 3/2021 | Hunsberger et al. |
| 2021/0069511 | A1 | 3/2021 | Hunsberger et al. |
| 2021/0244951 | A1 | 8/2021 | Cha et al. |
| 2021/0315638 | A1 * | 10/2021 | Townley .................. G06N 3/04 |

OTHER PUBLICATIONS

Ardell et al., (2016). Translational neurocardiology: preclinical models and cardioneural integrative aspects. The Journal of physiology, 594(14), 3877-3909. https://doi.org/10.1113/JP271869.

Armour (2008). Potential clinical relevance of the 'little brain' on the mammalian heart. Experimental physiology, 93(2), 165-176. https://doi.org/10.1113/expphysiol.2007.041178.

Beaumont et al. (2013). Network interactions within the canine intrinsic cardiac nervous system:implications for reflex control of regional cardiac function. The Journal of physiology, 591(18), 4515-4533. https://doi.org/10.1113/jphysiol.2013.259382.

Bourke et al. (2010). Neuraxial modulation for refractory ventricular arrhythmias: value of thoracic epidural anesthesia and surgical left cardiac sympathetic denervation. Circulation, 121(21), 2255-2262. https://doi.org/10.1161/CIRCULATIONAHA.109.929703.

Buckley et al. (2016). Targeted stellate decentralization: Implications for sympathetic control of ventricular electrophysiology. Heart rhythm, 13(1), 282-288. https://doi.org/10.1016/j.hrthm.2015.08.022.

Choi et al. (2010). Intrinsic cardiac nerve activity and paroxysmal atrial tachyarrhythmia in ambulatory dogs. Circulation, 121(24), 2615-2623. https://doi.org/10.1161/CIRCULATIONAHA.109.919829.

Huang et al. (2020). The presence of ectopic atrial rhythm predicts adverse cardiovascular outcomesin a large hospital-based population. Heart Rhythm, 17(6), 967-974. https://doi.org/10.1016/j.hrthm.2020.01.024.

Leftheriotis et al. (2016). Acute effects of unilateral temporary stellate ganglion block on humanatrial electrophysiological properties and atrial fibrillation inducibility. Heart rhythm, 13(11), 2111-2117. https://doi.org/10.1016/j.hrthm.2016.06.025.

Mohan et al. (2001). Intermittent hypoxia modulates nNOS expression and heart rate response to sympathetic nerve stimulation. American journal of physiology. Heart and circulatory physiology, 281(1), H132-H138. https://doi.org/10.1152/ajpheart.2001.281.1.H132.

Pachon et al. (2015). Simplified Method for Vagal Effect Evaluation in Cardiac Ablation and Electrophysiological Procedures. JACC. Clinical electrophysiology, 1(5), 451-460. https://doi.org/10.1016/j.jacep.2015.06.008.

Pistoia et al. (2016). The Epidemiology of Atrial Fibrillation and Stroke. Cardiology clinics, 34(2), 255-268. https://doi.org/10.1016/j.ccl.2015.12.002.

Priori et al. (2013). HRS/EHRA/APHRS expert consensus statement on the diagnosis and management of patients with inherited primary arrhythmia syndromes: document endorsed by HRS, EHRA, and APHRS in May 2013 and by ACCF, AHA, PACES, and AEPC in Jun. 2013. Heart rhythm, 10(12), 1932-1963. https://doi.org/10.1016/j.hrthm.2013.05.014.

Rana et al. (2011). Chronic electrical neuronal stimulation increases cardiac parasympathetic tone by eliciting neurotrophic effects. Circulation Research, 108(10), 1209-1219. https://doi.org/10.1161/circresaha.110.234518.

Schwartz et al. (2004). Left cardiac sympathetic denervation in the management of high-risk patients affected by the long-QT syndrome. Circulation, 109(15), 1826-1833. https://doi.org/10.1161/01.CIR.0000125523.14403.1E.

Schwartz et al. (1976). Effects of unilateral cardiac sympathetic denervation on the ventricular fibrillation threshold. The American journal of cardiology, 37(7), 1034-1040. https://doi.org/10.1016/0002-9149(76)90420-3.

Vaseghi et al. (2017). Cardiac Sympathetic Denervation for Refractory Ventricular Arrhythmias. Journal of the American College of Cardiology, 69(25), 3070-3080. https://doi.org/10.1016/j.jacc.2017.04.035.

Vaseghi et al. (2014). Cardiac sympathetic denervation in patients with refractory ventricular arrhythmias or electrical storm: intermediate and long-term follow-up. Heart rhythm, 11(3), 360-366. https://doi.org/10.1016/j.hrthm.2013.11.028.

Wilde et al. (2008). Left cardiac sympathetic denervation for catecholaminergic polymorphic ventricular tachycardia. The New England journal of medicine, 358(19), 2024-2029. https://doi.org/10.1056/NEJMoa0708006.

* cited by examiner

SYSTEMS AND METHODS OF DENERVATION AROUND SUBCLAVIAN ARTERIES

REFERENCE TO RELATED APPLICATIONS

This application claims the benefit of U.S. Provisional Application No. 63/367,578 filed Jul. 1, 2022 and U.S. Provisional Application No. 63/430,614 filed Dec. 6, 2022, the entire disclosure of each is hereby incorporated by reference herein in its entirety.

BACKGROUND

Field

The present disclosure relates generally to systems and methods for facilitating modulation (e.g., denervation, ablation), and more particularly in some embodiments to systems and methods for facilitating therapeutic modulation of the nerves around a subject's left and/or right subclavian artery to treat a heart disease (e.g., atrial fibrillation).

Description of the Related Art

Cardiac ventricular arrhythmia is responsible for over 80,000 deaths per year in the United Kingdom and over 150,000 deaths per year in the United States, the vast majority of ventricular arrhythmia is associated with coronary heart disease and/or heart failure, but the morbidity and cost burden is associated with this goes far beyond these figures. Cardiovascular disease accounts for £12 billion of United Kingdom direct healthcare expenditure per year and an estimated $378 billion of direct and indirect costs in the United States per year, and heart failure and the associated arrhythmia care are major drivers of spending. Atrial Fibrillation (AF) is a common and significant medical problem that affects approximately 3% of the population. The prevalence of AF in the United States is estimated to increase from about 5.2 million in 2010 to about 12.1 million in 2030. Individuals with AF have an increased risk of death, both in males and females, the age-adjusted mortality rate attributable to AF is 6.5 per 100,000 people. AF is associated with increased risk factors for other cardiovascular conditions including heart failure, myocardial infarction, and sudden cardiac death, diabetes, gastrointestinal bleeding and stroke, among other conditions.

SUMMARY

Cardiac arrhythmias are due to heterogeneity built in the cardiac muscle, but made worse by dynamic changes in sympathetic (adrenergic) and parasympathetic (cholinergic) signaling. In cardiac disease, there is a higher sympathetic signaling emanating from the brainstem and traverses to the heart via the thoracic sympathetic nerves. Most surgical denervation procedures (stellectomy) deal with surgeons locating the ganglia and empirically removing the thoracic segments (T1-T4) level of the sympathetic ganglia; as they are the most accessible nerves. This procedure has accompanying side-effects that impact the patient's quality of life.

Nerves that surround the blood vessels that feed the arms (the subclavian arteries) called subclavian ansae, connect two paravertebral sympathetic ganglia on the same side of the body, thereby forming a highly selective access pathway of sympathetic neural innervation to the heart. As a result, targeting the subclavian ansae on one or both sides for ablation is a novel mechanism to selectively modulate the sympathetic innervation to the heart. Applying energy to non-therapeutically stimulate these nerves can confirm that the nerves feeding the heart are affected by the application of the energy by a change in a heart condition as indicated by monitoring a heart parameter (e.g., heart rate, etc.). Energy can then be applied to ablate or destroy the affected nerves on a longer term basis, which has a beneficial effect on the heart to reduce cardiac electrical heterogeneity and reduce further pathological disease progression. There are posterior (dorsal) and anterior (ventral) subclavian ansae around both the left and right subclavian arteries, and a user can selectively target stimulation and ablate any of the four to any extent desired to have different effects. The stimulation is not therapeutic, but is used to identify a location for therapeutic ablation.

In some embodiments, a method of treating atrial fibrillation in a subject comprises percutaneously introducing a catheter into vasculature of the subject. The catheter comprises a neuromodulation element. The method further comprises positioning the neuromodulation element in a left subclavian artery of the subject, electrically stimulating a left dorsal subclavian ansae, confirming stimulation of the left dorsal subclavian ansae by monitoring a first cardiac parameter, after confirming stimulation of the left dorsal subclavian ansae, providing ablation energy to the left dorsal subclavian ansae, electrically stimulating a left ventral subclavian ansae, confirming stimulation of the left ventral subclavian ansae by monitoring a second cardiac parameter, after confirming stimulation of the left ventral subclavian ansae, providing ablation energy to the left ventral subclavian ansae, positioning the neuromodulation element in a right subclavian artery of the subject, electrically stimulating a right dorsal subclavian ansae, confirming stimulation of the right dorsal subclavian ansae by monitoring a third cardiac parameter, after confirming stimulation of the right dorsal subclavian ansae, providing ablation energy to the right dorsal subclavian ansae, electrically stimulating a right ventral subclavian ansae, confirming stimulation of the right ventral subclavian ansae by monitoring a fourth cardiac parameter, and after confirming stimulation of the right ventral subclavian ansae, providing ablation energy to the right ventral subclavian ansae. In some embodiments, the temperature for ablation may be delivered so the target tissue is heated to between 40-80 degrees Celsius and delivered for a time period of between 20 to 240 seconds. Cooling non-target tissue is optionally provided, however in several embodiments cooling is not required. In some embodiments, after stimulation of the left ventral subclavian ansae and left dorsal subclavian ansae, the left ventral subclavian ansae and left dorsal subclavian ansae are provided ablation energy simultaneously. In some embodiments, after stimulation of the right ventral subclavian ansae and right dorsal subclavian ansae, the right ventral subclavian ansae and right dorsal subclavian ansae are provided ablation energy simultaneously.

The first cardiac parameter may be the different than at least one of the second cardiac parameter, the third cardiac parameter, or the fourth cardiac parameter. The second cardiac parameter may be the different than at least one of the first cardiac parameter, the third cardiac parameter, or the fourth cardiac parameter. The third cardiac parameter may be the different than at least one of the first cardiac parameter, the second cardiac parameter, or the fourth cardiac parameter. The fourth cardiac parameter may be the different than at least one of the first cardiac parameter, the second cardiac parameter, or the third cardiac parameter. The first cardiac parameter may be the same as at least one of the second cardiac parameter, the third cardiac parameter, or the fourth cardiac parameter. The second cardiac parameter may be the same as at least one of the first cardiac parameter, the third cardiac parameter, or the fourth cardiac parameter. The third cardiac parameter may be the same as at least one of the first cardiac parameter, the second cardiac parameter, or the fourth cardiac parameter. The fourth cardiac parameter may be the same as at least one of the first cardiac parameter, the second cardiac parameter, or the third cardiac parameter.

At least one of the first cardiac parameter, the second cardiac parameter, the third cardiac parameter, or the fourth cardiac parameter may comprise at least one of arterial trace blood pressure change, whether AF is induced, whether arrhythmia is induced, whether a change in cardiac cycle length is induced, repeat restitution curve, right atrial ERP, left atrial ERP, dERP, heart rate, IACT, or unipolar electrogram from multipolar catheter under steady state RV pacing or with short DI after steady state RV pacing. The method may further comprise, after providing ablation energy, restimulating the subclavian ansae and, if a cardiac parameter confirms stimulation, providing further ablation energy to the subclavian ansae. The method may comprise repeating the restimulating and providing further ablation energy until the cardiac parameter does not confirm stimulation. The catheter may include an expansion element on which the neuromodulation element is positioned. The expansion element may be expanded element to dilate the vasculature.

In some embodiments, a method of treating heart disease in a subject comprises percutaneously introducing a catheter into vasculature of the subject. The catheter comprises a neuromodulation element. The method further comprises positioning the neuromodulation element in a subclavian artery of the subject, electrically stimulating a dorsal subclavian ansae, confirming stimulation of the dorsal subclavian ansae by monitoring a cardiac parameter, after confirming stimulation of the dorsal subclavian ansae, providing ablation energy to the dorsal subclavian ansae, electrically stimulating a ventral subclavian ansae, confirming stimulation of the ventral subclavian ansae by monitoring a second cardiac parameter, and after confirming stimulation of the ventral subclavian ansae, providing ablation energy to the ventral subclavian ansae. In some embodiments, after electrically stimulating a and confirming stimulation of the dorsal subclavian ansae and the ventral subclavian ansae, ablation energy is provided to the dorsal subclavian ansae and the ventral subclavian ansae at the same time.

The first cardiac parameter may be the different than the second cardiac parameter. The first cardiac parameter may be the same as the second cardiac parameter. At least one of the first cardiac parameter or the second cardiac parameter may comprise at least one of arterial trace blood pressure change, whether AF is induced, whether arrhythmia is induced, whether a change in cardiac cycle length is induced, repeat restitution curve, right atrial ERP, left atrial ERP, dERP, heart rate, IACT, or unipolar electrogram from multipolar catheter under steady state RV pacing or with short DI after steady state RV pacing.

The method may further comprise, after providing ablation energy, restimulating the subclavian ansae and, if a cardiac parameter confirms stimulation, providing further ablation energy to the subclavian ansae. The method may comprise repeating the restimulating and providing further ablation energy until the cardiac parameter does not confirm stimulation. The catheter may include an expansion element on which the neuromodulation element is positioned. The method may further comprise expanding the expansion element an amount to dilate the vasculature.

In some embodiments, a method of treating heart disease in a subject comprises percutaneously introducing a catheter into vasculature of the subject. The catheter comprises a neuromodulation element. The method further comprises positioning the neuromodulation element in a subclavian artery of the subject, electrically stimulating at least one of a dorsal subclavian ansae or a ventral subclavian ansae, confirming stimulation of the dorsal subclavian ansae and/or the ventral subclavian ansae by monitoring a cardiac parameter, and after confirming stimulation of the dorsal subclavian ansae and/or the ventral subclavian ansae, providing ablation energy to the dorsal subclavian ansae and/or the ventral subclavian ansae. The method may comprise after electrically stimulating a dorsal subclavian ansae and a ventral subclavian ansae, and/or confirming stimulation of the dorsal subclavian ansae and the ventral subclavian ansae by monitoring a cardiac parameter, simultaneously providing ablation energy to the dorsal subclavian ansae and the ventral subclavian ansae.

The method may further comprise, after providing ablation energy, restimulating the subclavian ansae and, if a cardiac parameter confirms stimulation, providing further ablation energy to the subclavian ansae. The method may comprise repeating the restimulating and providing further ablation energy until the cardiac parameter does not confirm stimulation.

Percutaneously introducing the catheter to the vasculature may comprise inserting the catheter into a femoral artery of the subject. Percutaneously introducing the catheter to the vasculature may comprise inserting the catheter into a radial artery of the subject. Percutaneously introducing the catheter to the vasculature may comprise inserting the catheter into a carotid artery of the subject. Percutaneously introducing the catheter to the vasculature may comprise inserting the catheter into a femoral vein of the subject. At least one of positioning the neuromodulation element in the left subclavian artery or positioning the neuromodulation element in right left subclavian artery may comprise crossing from venous vasculature to arterial vasculature.

In some embodiments, a method of treating heart disease in a subject comprises positioning a neuromodulation element in a subclavian artery of the subject, electrically stimulating at least one of a dorsal subclavian ansae or a ventral subclavian ansae, confirming stimulation of the dorsal subclavian ansae and/or the ventral subclavian ansae by monitoring a cardiac parameter, and after confirming stimulation of the dorsal subclavian ansae and/or the ventral subclavian ansae, providing ablation energy to the dorsal subclavian ansae and/or the ventral subclavian ansae. In some embodiments, ablation energy is provided to the dorsal subclavian ansae and the ventral subclavian ansae at the same time.

The ablation energy may comprise radiofrequency ablation energy. The ablation energy may comprise cryogenic ablation energy. Electrically stimulating may comprise using a combination of electrodes of the neuromodulation element. Providing ablation energy may comprise using the same combination of electrodes of the neuromodulation element.

The heart disease may comprise atrial fibrillation. The heart disease may comprise refractory arrhythmias. The method may further comprise assessing whether sympathetic drive is driving the refractory arrhythmias. The heart disease may comprise ventrical tachycardia. The heart disease may comprise ventrical fibrillation. The heart disease may comprise congestive heart failure. The heart disease may comprise atrial flutter.

In some embodiments, a catheter for treating heart disease in a subject comprises, or alternatively consists essentially of, an elongate element configured to be positioned in at least one of a left subclavian artery or a right subclavian artery. A distal portion of the elongate element comprises a first neuromodulation element configured to stimulate at least one of a dorsal subclavian ansae or a ventral subclavian ansae, a second neuromodulation element configured to ablate at least one of the dorsal subclavian ansae or the ventral subclavian ansae, and a distal protection device distal to the first neuromodulation element and the second neuromodulation element.

The first neuromodulation element may comprise a first plurality of electrodes coupled to a first plurality of struts. The first neuromodulation element may comprise a first plurality of electrodes coupled to a first loop. The first neuromodulation element may comprise a first plurality of electrodes coupled to a first corkscrew. The second neuromodulation element may comprise the first plurality of electrodes a second plurality of electrodes coupled to a second plurality of struts. The second neuromodulation element may comprise the first plurality of electrodes or a second plurality of electrodes coupled to a second loop. The second neuromodulation element may comprise the first plurality of electrodes or a second plurality of electrodes coupled to a second corkscrew. At least one electrode of the plurality of electrodes may comprise a triangular base including a tip configured to press into a vessel wall. The at least one electrode further may comprise a plurality of electrode bumps on different sides of the tip of the triangular base. The catheter may further comprise an expansion element. The first and second neuromodulation elements may be positioned on the expansion element.

In some embodiments, a catheter for treating heart disease in a subject comprises, or alternatively consists essentially of, an elongate element configured to be positioned in at least one of a left subclavian artery or a right subclavian artery. A distal portion of the elongate element comprises a neuromodulation element configured to stimulate at least one of a dorsal subclavian ansae or a ventral subclavian ansae and configured to ablate at least one of the dorsal subclavian ansae or the ventral subclavian ansae, and a distal protection device distal to the neuromodulation element.

The neuromodulation element may comprise a plurality of electrodes coupled to a plurality of struts. The neuromodulation element may comprise a plurality of electrodes coupled to a loop. The neuromodulation element may comprise a plurality of electrodes coupled to a corkscrew. At least one electrode of the plurality of electrodes may comprise a triangular base including a tip configured to press into a vessel wall. The at least one electrode further may comprise a plurality of electrode bumps on different sides of the tip of the triangular base. The catheter may further comprise an expansion element. The neuromodulation element may be positioned on the expansion element.

In some embodiments, a method of treating a subject comprises stimulating specific electrodes of a neuromodulation device, providing results to an interface computer configured to, perform real time data analysis and overlay an anatomical image with response to the stimulating including marking locations with maximal response, and ablating at the locations.

The method may further comprise, after ablating, restimulating to verify efficacy of the ablating. The may further comprise, if the ablating was not efficacious, further ablating. The method may comprise repeating the verifying and further ablating until the ablating is efficacious.

In some embodiments, a method of treating a subject presenting refractory arrhythmias comprises stabilizing the subject, assessing a cause of the refractory arrhythmias, assessing whether sympathetic drive is driving the refractory arrhythmias, if sympathetic drive is not driving the refractory arrhythmias, coordinating assessing the arrhythmogenic focus, and if sympathetic drive is driving the refractory arrhythmias, performing a subclavian ansae ablation procedure.

Assessing whether sympathetic drive is driving the refractory arrhythmias may comprise instilling epidural anesthesia. Assessing whether sympathetic drive is driving the refractory arrhythmias may comprise switching off an implantable cardioverter defibrillator of the subject.

In some embodiments, a method of treating heart disease in a subject comprises positioning a neuromodulation element in a subclavian artery of the subject and providing ablation energy to dorsal subclavian ansae and/or ventral subclavian ansae.

Providing the ablation energy may comprise selectively providing the ablation energy. Selectively providing the ablation energy may comprise non-therapeutically stimulating to determine a position of the dorsal subclavian ansae and/or ventral subclavian ansae. Selectively providing the ablation energy may comprise imaging the subclavian artery to determine a likely position of the dorsal subclavian ansae and/or ventral subclavian ansae. Providing the ablation energy comprises providing the ablation energy all around the subclavian artery.

In some embodiments, a method of treating a subject comprises positioning a neuromodulation element of a catheter in a subclavian artery of the subject. The neuromodulation element may comprise an array of electrodes spaced circumferentially about a circumference of the catheter and longitudinally along a length of the catheter. The method may include stimulating specific electrodes of the array of electrodes, providing results to an interface computer configured to perform real time data analysis; and overlay an anatomical image with response to the stimulating including marking locations with maximal response; and ablating at the marked locations.

The method may further include, after ablating, restimulating to verify efficacy of the ablating. The method may comprise, if the ablating was not efficacious, further ablating. The method may comprise repeatedly restimulating and further ablating until verifying that the ablating is efficacious. The neuromodulation element may be positioned on an expansion element. The method may comprise expanding the expansion element an amount to dilate the subclavian artery.

In some embodiments, a catheter for treating heart disease in a subject may comprise an elongate element configured to be positioned in at least one of a left subclavian artery or a right subclavian artery. A distal portion of the elongate element may comprise a neuromodulation element configured to stimulate at least one of a dorsal subclavian ansae or a ventral subclavian ansae and configured to ablate at least one of the dorsal subclavian ansae or the ventral subclavian ansae. The neuromodulation element of a catheter is configured to be positioned in a subclavian artery of the subject. The neuromodulation element comprises an array of electrodes spaced circumferentially about a circumference of the catheter and longitudinally along a length of the catheter.

The neuromodulation element may comprise a plurality of electrodes coupled to a plurality of struts. The neuromodulation element may comprise a plurality of electrodes coupled to a loop. The neuromodulation element may comprise a plurality of electrodes coupled to a corkscrew. The at least one electrode of the plurality of electrodes may comprise a triangular base including a tip configured to press into a vessel wall. The catheter may comprise an expansion element. The expansion element may comprise a balloon.

In some embodiments, a method of treating heart disease in a subject comprises percutaneously introducing a catheter into vasculature of the subject, wherein the catheter comprises a neuromodulation element; positioning the neuromodulation element in a subclavian artery of the subject; electrically stimulating at least one of a dorsal subclavian ansae or a ventral subclavian ansae, confirming stimulation of the dorsal subclavian ansae and/or the ventral subclavian ansae by monitoring a biomarker, wherein the biomarker comprises at least one of an inotropic biomarker, a chronotropic biomarker, a dromotropic biomarker, a lusitropic biomarker; or an inflammatory biomarker; after confirming stimulation of the dorsal subclavian ansae and/or the ventral subclavian ansae, providing ablation energy to the dorsal subclavian ansae and/or the ventral subclavian ansae.

The method may further comprise after providing ablation energy, restimulating the subclavian ansae and, if a biomarker confirms stimulation, providing further ablation energy to the subclavian ansae. The method may comprises repeating the restimulating and providing further ablation energy until the biomarker does not confirm stimulation. The biomarker may comprise at least one of developed pressure (dP/dt), arterial blood pressure (systolic, diastolic, mean), changes in pulse pressure, increase in systemic blood pressure, or an increase in left ventricular developed pressure (dP/dt). The biomarker may comprise at least one of heart rate changes (changes in R_R or Q_Q intervals on surface ECG), increase in heart rate (R-R interval shortening), or changes in basal cycle length on intracardiac electrogram. The biomarker may comprise a dromotropic biomarker. The catheter can include a balloon and the neuromodulation element can be positioned on the balloon. The method can comprise expanding the balloon catheter an amount to dilate the vasculature of the subject.

In some embodiments, a method of treating heart disease in a subject comprises positioning a neuromodulation element positioned on an expansion element in a subclavian artery of the subject; expanding the expansion element; electrically stimulating at least one of a dorsal subclavian ansae or a ventral subclavian ansae; confirming stimulation of the dorsal subclavian ansae and/or the ventral subclavian ansae by monitoring a cardiac parameter; and after confirming stimulation of the dorsal subclavian ansae and/or the ventral subclavian ansae, providing ablation energy to the dorsal subclavian ansae and/or the ventral subclavian ansae.

The ablation energy may comprise radiofrequency ablation energy. The ablation energy may comprise cryogenic ablation energy. The method may comprise electrically stimulating using a combination of electrodes of the neuromodulation element, and wherein providing ablation energy comprises using the same combination of electrodes of the neuromodulation element. The heart disease may comprise atrial fibrillation. The heart disease may comprise refractory arrhythmias.

In some embodiments, a catheter for treating heart disease in a subject comprises an elongate element configured to be positioned in at least one of a left subclavian artery or a right subclavian artery, wherein a distal portion of the elongate element comprises: an expansion element, a neuromodulation element positioned on the expansion element and configured to stimulate at least one of a dorsal subclavian ansae or a ventral subclavian ansae and configured to ablate at least one of the dorsal subclavian ansae or the ventral subclavian ansae, the neuromodulation element of a catheter in a subclavian artery of the subject, the neuromodulation element comprising an array of electrodes spaced circumferentially about a circumference of the catheter and longitudinally along a length of the catheter.

The neuromodulation element may comprise a plurality of electrodes coupled to a plurality of struts. The neuromodulation element may comprise a plurality of electrodes coupled to a loop. The at least one electrode of the plurality of electrodes may comprise a triangular base including a tip configured to press into a vessel wall.

In some embodiments, a treatment system comprises, consists essentially of, or consists of one or more of the features described herein.

In some embodiments, a tissue treatment system comprises, consists essentially of, or consists of one or more of the features described herein.

In some embodiments, a method of ablating subclavian ansae comprises, consists essentially of, or consists of one or more of the features described herein.

BRIEF DESCRIPTION OF THE DRAWINGS

The following drawings are for illustrative purposes only and show non-limiting embodiments. Features from different figures may be combined in several embodiments.

DETAILED DESCRIPTION

Figure 1:
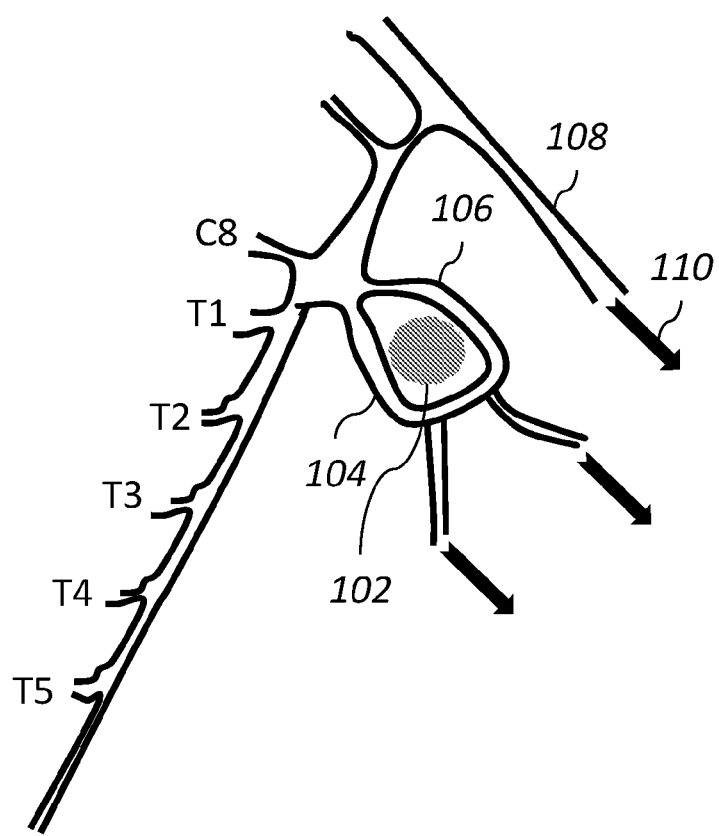
FIG. 1 is a schematic diagram showing an example innervation of the sympathetic nerve tracts to the heart.

The majority of arrhythmic events result from myocardial infarction (MI) due to coronary artery disease, but heart failure from any cause gives a strong predisposition towards arrhythmia. Therapies for myocardial infarction such as primary angioplasty and stenting can be effective at restoring blood flow, but significant residual myocardial damage can result. A common finding amongst patients with myocardial damage is an underlying elevated sympathetic nerve signaling that acts to increase stress of the cardiovascular system even further. This deleterious cascade drives heart failure and arrhythmia. Beta-blockers can reduce the impact of elevated sympathetic tone and are a mainstay of arrhythmia prevention and key treatment for heart failure. However, these drugs are incompletely effective and have major systemic side effects at the high doses required for therapeutic effects.

An implantable cardioverter defibrillator (ICD) can be implanted to inhibit sudden cardiac death due to ventricular arrhythmias. These devices monitor the heart rhythm and provide a direct electrical cardioversion if a tachyarrhythmia is detected, thereby offering an insurance pathway as a reactive therapy. However, ICDs are associated with major iatrogenic morbidity: patients have a life punctuated by generator and lead revisions, life-threatening device infections are common, and very painful inappropriate shocks are frequent (1 in 20 patients), and can even cause skin burns. The overwhelming majority of ICDs are implanted as primary prevention devices (e.g., in case an arrhythmia occurs), yet in these patients even a modest reduction in arrhythmic risk would reverse the risk/benefit profile of ICDs. Multiple clinical trials and meta-analysis have shown the prevalence of inappropriate shocks from ICDs. While most patients are implanted for primary prevention, the algorithms do not predict arrhythmias well, and, as a result, patients receive inappropriate shocks (shocks delivered when it is not appropriate or when fatal arrhythmia is absent). There is also emerging literature evidence to demonstrate that cumulative increase in shocks leads to further electrical instability in the heart that drives more arrhythmias and hospitalization for inappropriate shocks for symptoms ranging from extreme discomfort (pain to skin burns) to death. In these patients who present with arrhythmias despite ICD implants, thoracic epidural anesthesia is provided for pain relief and to stratify patients who are likely candidates for stellectomy. A stellectomy or stellate decentralization procedure can address the elevated sympathetic signaling (due to cardiac disease) mediated by direct neural pathways that emanate from the heart, travel to the brain stem regions, and travel back to the heart via extracardiac, intrathoracic nerve tracts (like the paravertebral sympathetic chain and its associated nerves (e.g., subclavian ansae)) and can provide a tangible biological target to reduce life-threatening arrhythmia and progression of heart failure. The limited treatment strategies available for incipient heart failure and secondary arrhythmias leave many patients with few choices during disease progression. Although catheter ablation of ventricular arrhythmia can be effective for some patients, it is a highly complex procedure and does not alter the underlying pathology. Many patients who are considered at risk for ventricular arrhythmia progress through levels of increasing pharmacological titration, with or without a device (ICD) implant, before ICD implantation can be performed.

In the case of atrial arrhythmias, the most prevalent arrhythmia, atrial fibrillation, is caused due to imbalance of the nerve supply to the disparate anatomy of the atria (composed of cardiac tissue meeting vascular tissue, interspersed with fat pads) that precipitate arrhythmias. Current treatment strategies are electrophysiological procedures that directly map the most heterogeneous regions of the atria and then disconnecting/electrically isolating these areas from the rest of the atria. All these procedures target intracardiac structures that do not provide complete arrhythmia free survival. A significant proportion of patients have recurrence of arrhythmias, and experimental procedures like fat pad ablation or ganglionated plexi ablation is carried out on the surface of the heart. These intracardiac structures receive their neural supply from the sympathetic and parasympathetic nerve tracts that are extracardiac, with sympathetic nerves causing significant heterogeneity that precipitates atrial fibrillation. The operator performing the ganglionated plexi ablation is not aware of success of ablation of all neural tissue at the time of the procedure.

The nexus point for pathological upregulated cardiac sympathetic signaling derives from the thoracic sympathetic chain ganglia at the upper thoracic levels. In most severe cases of cardiac arrhythmias, increased sympathetic signaling is a major cause of arrhythmia induction in both atria and ventricle. Sympathetic signaling increase or decrease plays a significant role in modulating the cardiac inotropic, dromotropic, lusitropic, and chronotropic properties. In addition, modulation of the cardiac activation recovery intervals or refractory periods is well depicted in the literature in both preclinical studies and human studies. As a result, cardiac disease conditions like long Q-T syndrome patients who have an underlying sympathetic overdrive have been considered as candidates for surgical removal of stellate ganglion (stellectomy/stellate decentralization). Highly invasive stellectomy/stellate decentralization (denervation of the heart by resection of stellate ganglia) has been performed by cardiac surgeons to treat life-threatening arrhythmias with good effect. For example, these procedures can reduce arrhythmia burden in long QT syndrome patients. In patients who exhibited refractory ventricular arrhythmias, the only effective treatment was thoracic epidural anesthesia to block the sympathetic traffic followed by surgical stellate removal using video assisted thoracoscopy. However, these stellectomy/stellate decentralization procedures are highly invasive, requiring general anesthesia and highly specialized surgical skills and/or robotic equipment, and are associated with elevated procedural risks in a patient population with advanced cardiac disease. Despite technical advances, such as video-assisted thoracoscopy, only select surgeons perform this procedure in specific centers, and currently this procedure is only carried out for refractory patients as a "last resort" therapy.

While stellectomy can be effective in reducing the arrhythmias by >90%, the patients suffer from post-operative complications that are highly variable. The surgeon has to remove the stellate ganglion by visual examination, and this is a highly delicate part as the stellate ganglion controls the sympathetic innervation to the arms, shoulders, and the upper back. Due to lack of clear identifiable margins during surgery that cannot be ascertained during surgery to understand axial, pectoral vs. cardiac fibers, surgeons perform stellectomy by naked eye surgery. As a result of this empirical and highly subjective procedure, many patients exhibit symptoms of spared nerve injury, which drives increased pain sensation (hyperalgesia) and asymmetrical sudomotor function (hyperhidrosis/anhidrosis) of the affected upper extremities. Furthermore, the robotic surgery required is highly complex endeavor driving up healthcare costs and reducing access.

There may be an important interactions between the heart and the autonomic nervous system (ANS) in the pathophysiology of arrhythmias. Derangement of ANS has proven to play an important role in cardiac arrhythmogenesis. The role of ANS in the onset and maintenance of AF is related to autonomic imbalance. Modulation of autonomic nervous signaling holds a significant promise for the reduction (e.g., prevention) and treatment of cardiac arrhythmias (e.g., vagal nerve stimulation clinical trials). The cardiac autonomic nervous system is a complex structure and provides many easily accessible minimally invasive targets. Use of autonomic modification for treatment of AF may include potential targets for therapy such as autonomic ganglionic plexi, renal denervation, stellate ganglion block, vagus nerve stimulation (e.g., low level vagus nerve stimulation), tragus stimulation, renal denervation, spinal cord stimulation, baroreceptor activation, and cardiac sympathetic denervation. Some target like stellate ganglion block/sympathectomy may have off-target side-effects, while other targets do not directly impact the reduction of sympathetic signaling. Anesthetic blocks of the stellate ganglia is reversible and patients experience symptoms of spared nerve injury after a few months and is offered only as a palliative treatment in extreme cases. Paroxysmal atrial tachycardia or atrial fibrillation (AT/AF) in animal models are preceded by increased extrinsic cardiac nerve activity demonstrated in the left stellate ganglion. Stimulation of the stellate ganglion increases sinus rate and predisposes to atrial arrhythmias. Unilateral temporary stellate ganglion block can prolong atrial effective refractory period (ERP), reduce AF inducibility, and/or decrease AF duration. Renal denervation can result in a significantly greater freedom from AF compared to standard pulmonary vein isolation alone.

A therapy that selectively targets the cardiac sympathetic neuronal supply using a percutaneous, intravascular device can provide users (e.g., cardiologists) with the ability to be able to provide effective, safe, and permanent neuromodulatory treatment for subjects at risk of arrhythmia, even as an adjunct to primary catheterization procedures. Synergy across pathophysiological mechanisms indicate that this could be useful as a novel treatment angle for heart failure patients, particularly those unable to tolerate beta-blockade.

Cardiac dysfunction drives increased sensory signaling to the brain stem, which in turn upregulates compensatory inotropic mechanisms, which can be pathogenic in the early stage of the disease. In the case of an ischemic heart disease leading to reduction in pump function, cardiac sympathetic signaling is enhanced in the early stages to maintain cardiac output and adequate oxygenation of the extremities. As the disease progresses, these sympathetic responses gets amplified, and this drives cardiac pathology. This pathology drives the following responses: replacement fibrosis of the cardiac muscle and increased sympathetic nerve sprouting in the heart. While the first is a mal-adaptive response to stress, increase in sympathetic nerve sprouting is initially an adaptive response, which over time sets up increased heterogeneity. Fibrosed cardiac muscles act as diversion and areas with sympathetic nerve sprouting act as speed paths. This is an ideal substrate for development of cardiac arrhythmias. The cardiac ANS has a significant impact on cardiac electrophysiology and arrhythmogenesis. This impact is diverse: different types of arrhythmias have different autonomic triggers. With growing knowledge in the identification of those specific triggers, appropriate treatment modalities through neural modulation can be applied accordingly.

FIG. 1 is a schematic diagram showing an example innervation of the sympathetic nerve tracts to the heart. The subclavian artery 102 is surrounded by dorsal subclavian ansae 104 and ventral subclavian ansae 106. The subclavian ansae 104, 106 is a nerve cord that forms a loop inferiorly around the subclavian artery and connects the inferior cervical ganglion and middle cervical ganglia (also referred to as the C8 and T1 levels of the paravertebral sympathetic chain). The vagus nerve 108 is also illustrated. The arrows 110 indicate that the illustrated nerves extend towards the heart. C8/T1 levels of the sympathetic chain (stellate ganglia) are predominantly fused or mildly separated in most human subjects and provide nerve supply to the muscles of the shoulders, arms, and the heart. The subclavian ansae 104, 106 serve to route the sympathetic traffic exclusively innervating to and from the heart and connect the heart to the T1 segment directly. The route of sympathetic traffic to the heart occurs via the stellate ganglia that receives sympathetic input from the middle cervical ganglia via two discrete nerve tracts, the dorsal subclavian ansae 104 and the ventral subclavian ansae 106. These two nerves pass over and under the subclavian artery 102, carrying in them the sympathetic efferent (motor) neurons that increase cardiac rate (chronotropy), contractility (inotropy), relaxation (lusitropy), and conduction velocity (dromotropy). The origins of the efferent fibers that pass via the subclavian ansae are the T1-T4 thoracic sympathetic chain ganglia, which converge up toward T1 as they travel from ventral rami of the spinal cord to T4, to T3, to T2, to T1, before converging at the middle cervical ganglia (C8-T1) through the subclavian ansae 104, 106, and then proceeding to the heart. The afferent fibers seems to bypass the subclavian ansae 104, 106 and pass directly to C8 ganglia. Surgical denervation for cardiac arrhythmia treatment relies on removing entire T4 to half of C8/T1 complex (removal of four ganglionic cell bodies and their interganglionic tracts, without impacting subclavian ansae 104, 106 due to the procedural complexity of operating around the subclavian artery 102).

Cardiac-related preganglionic fibers arising from the thoracic cord traverse up the paravertebral chain through the T1-T2 region, some making synaptic contact with postganglionic neurons in the stellate with others projecting through the subclavian ansae 104, 106 to more distal intrathoracic ganglia (middle cervical, mediastinal, and intrinsic) to mix with parasympathetic vagal fibers. As such, the subclavian ansae 104, 106 and the T1-T2 region of the paravertebral chain are nexus points for sympathetic nerve traffic to afferent projections of the heart. Based on structure and function consideration, both sites are potential targets for cardiac neuromodulation.

Preclinical studies in dogs and more recently pigs showed that stimulation of the subclavian ansae 104, 106 produces reproducible increases in cardiac rate, contractility, and conduction velocity and a decrease in relaxation. Denervation of the subclavian ansae 104, 106 followed by stellate ganglion stimulation a the proximal end (C8) results in no change in cardiac indices confirming the nodal intervention point for cardiac sympathetic traffic. Due to close anatomical correlation in size and anatomy, modulation of subclavian ansae 104, 106 is possible via subclavian artery 102 catheterization. Modulation of the subclavian ansae 104, 106 can produce reproducible increases in cardiac rate and contractility while speeding up conduction velocity. Denervation of the subclavian ansae 104, 106 followed by stellate ganglion stimulation results in no change in cardiac indices, confirming the nodal intervention point for cardiac sympathetic traffic.

The subclavian ansae 104, 106 can be targeted using percutaneous catheterization of the subclavian artery to map the nerves along the length of the subclavian artery 102, detect the presence of the nerve(s) 104, 106, and selectively ablate the nerve(s) 104, 106 through the subclavian artery. This is a cost-effective alternative to robotic surgery.

Figure 2A:
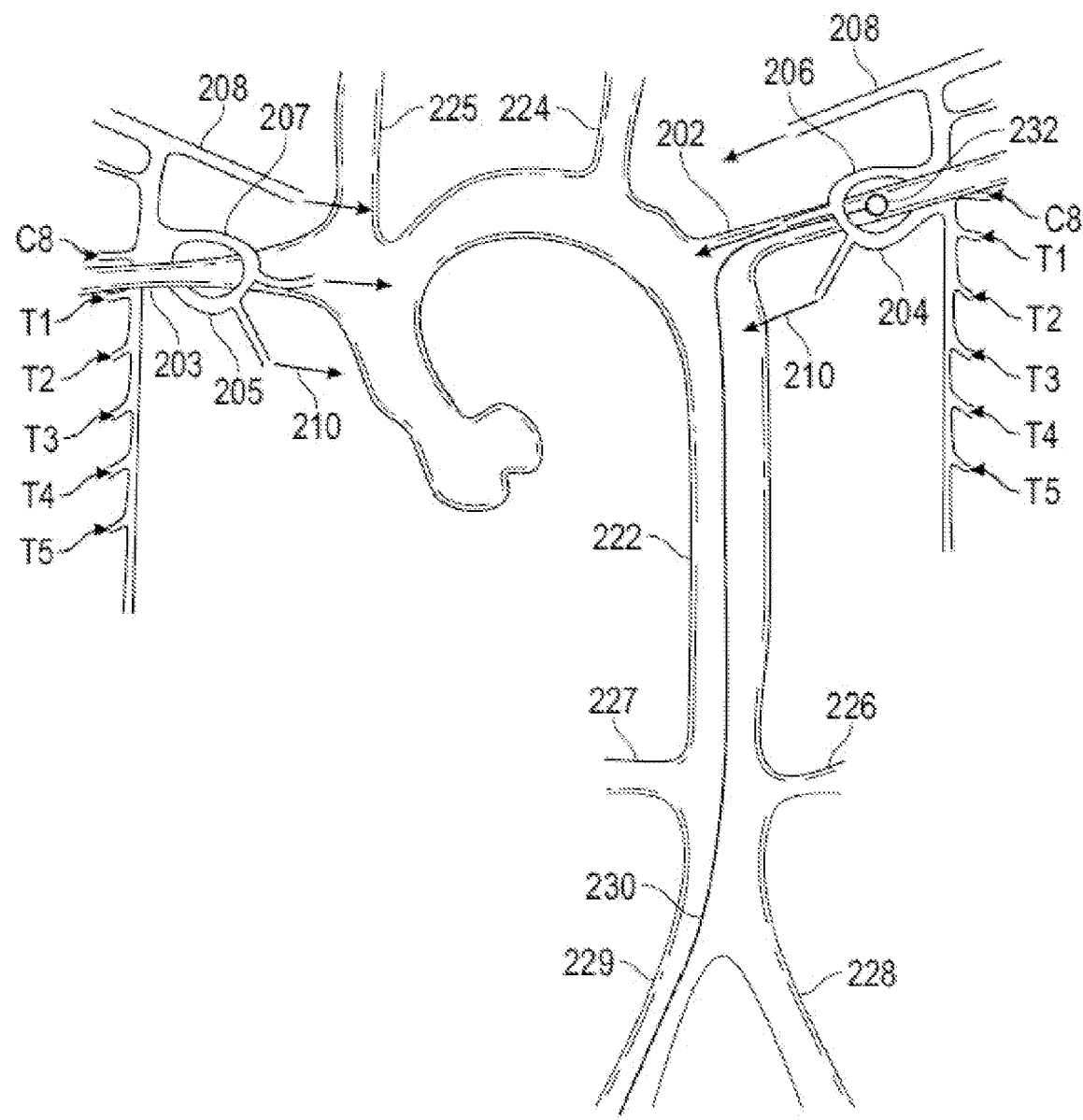
FIG. 2A is a schematic diagram of an example method of modulating nerves around a left subclavian artery.

FIG. 2A is a schematic diagram of an example method of modulating nerves 204, 206 around a left subclavian artery 202. FIG. 2A shows additional anatomy to FIG. 1, including the aorta 222 and its branch vessels. The innominate artery branches off the aorta 222 into the right subclavian artery 203, which supplies blood to the right arm, and the right common carotid artery 225, which supplies blood to the cerebral vasculature. The left common carotid artery 224, which supplies blood to the cerebral vasculature, branches directly off the aorta 222. The left subclavian artery 202, which supplies blood to the left arm, also branches directly off the aorta 222. The aorta 222 descends towards the lower body, branching into the left renal artery 226 and the right renal artery 227, and then into the left iliac artery 228 and the right iliac artery 229. The left subclavian artery 202 is surrounded by the dorsal subclavian ansae 204 and the ventral subclavian ansae 206. The right subclavian artery 203 is surrounded by the dorsal subclavian ansae 205 and the ventral subclavian ansae 207. The vagus nerve 208 is also illustrated.

FIG. 2A schematically illustrates a catheter 230 positioned to effect neuromodulation of the nerves 204, 206. As illustrated in FIG. 2A, the catheter 230 has been navigated from an access site in the lower body, such as the right femoral artery, to the left subclavian artery 202 (e.g., a position in the left subclavian artery 202 surrounded by the dorsal subclavian ansae 204 and the ventral subclavian ansae 206). The catheter 230 can be tracked over a guidewire, tracked through a guide catheter, directly navigated, and/or other methods of navigation. Other vascular access sites are also possible. For example, the right femoral artery, left or right radial access, a carotid artery, etc. can be accessed and then the catheter 230 can be routed through such vasculature to the left subclavian artery 202. For additional examples, venous vasculature may be accessed, and the catheter 230 may cross from the venous vasculature to the arterial vasculature (e.g., through a foramen ovale, through a dialysis fistula, etc.).

A distal portion of the catheter 230 comprises a neuromodulation element 232. For example, the neuromodulation element 232 may comprise one or more of the following means for modulation: a cryogenic element, a radiofrequency element, an ultrasound element, a laser element, a thermal delivery element, a chemical delivery element, a microwave element, an electrical element, pressure element, an acoustic element, a vibratory element, a mechanical stretching element, and/or the like.

Once the neuromodulation element 232 is positioned in the left subclavian artery 202, a signal can be applied to the neuromodulation (e.g., using appropriate energy levels for stimulation and safety of the procedure) to locate the nerves of the subclavian ansae 204, 206 for subclavian ansae stimulation (SAS), which is non-therapeutic. In some embodiments, the stimulation teaches away from therapy, for example because the stimulation causes a side effect such as inducing arrhythmias. Before, during, and/or after SAS, inotropy, chronotropy, and/or dromotropy can be measured to determine whether the subclavian ansae 204, 206 have been stimulated, for example in comparison to baseline (resting), vagal nerve stimulation, and/or induction of AF. SAS can be determined by cardiac hemodynamic, electrophysiological measurements, and or inducible atrial tachyarrhythmia.

In some embodiments, the vagus nerve 108 may also or alternatively be stimulated for vagus nerve stimulation (VNS). For example, an electrode catheter can be positioned in the internal jugular vein (IJV) and deliver energy to the vagus nerve 108 (e.g., at an amplitude of 0.5 to 1 V/kg, a frequency of 30 Hz, and a pulse width of 50 μs for 30 s). The output threshold can be determined to achieve 10-20% reduction in heart rate. An arterial trace can be recorded to determine effects on arterial pressure wave form.

Skin electrodes may be placed for monitoring diaphragmatic electromyography before, during, and/or after the procedure. The procedure may be performed under general anesthesia in a sterile field, and appropriate therapeutics such as heparin can be administered as needed. The percutaneous site, such as a femoral vein, femoral artery, or radial artery, can be accessed under ultrasound guidance. Arterial access is not routinely performed for AF ablation. In some embodiments, an arterial line may be placed for monitoring arterial pressure.

Baseline measurements prior to SAS/VNS can include, for example, baseline arterial trace, electrocardiogram, hearth rate, right atrial and/or left atrial ERP, difference in ERP between the left and right atria (dERP), heart rate, interatrial conduction time (IACT), and/or unipolar electrograms at baseline, during steady state right ventricular (RV) pacing at 20-30% above basal heart rate, and/or restitution curve with RV steady state pacing and short diastolic interval (S1-S2).

Measurements during and/or after SAS/VNS can include, for example, arterial trace blood pressure change, whether AF is induced, whether arrhythmia is induced, whether a change in cardiac cycle length is induced, repeat restitution curve, right atrial and/or left atrial ERP, dERP, heart rate, IACT, and/or unipolar electrogram from multipolar catheter under steady state RV pacing and/or with short DI after steady state RV pacing. Parameters monitored can vary based on the nerve. For example, the cardiac parameter(s) monitored when stimulating the dorsal subclavian ansae 204 can be different than the cardiac parameter(s) monitored when stimulating the ventral subclavian ansae 206 because modulation of those nerves may be expected to have different effects on the heart. Parameters monitored can also or alternatively vary based on the side. For example, the cardiac parameter(s) monitored when stimulating the left dorsal subclavian ansae 204 can be different than the cardiac parameter(s) monitored when stimulating the right dorsal subclavian ansae 206 (FIG. 2B) because modulation of those nerves may be expected to have different effects on the heart. The cardiac parameter(s) monitored when stimulating each subclavian ansae can be tailored. In some embodiments, the cardiac parameter(s) monitored when stimulating all of the subclavian ansae are the same. In some embodiments, the cardiac parameter(s) monitored when stimulating some of the subclavian ansae are the same and the cardiac parameter(s) monitored when stimulating others of the subclavian ansae are different. For example, the cardiac parameter(s) monitored when stimulating the left and right dorsal subclavian ansae may be the same the cardiac parameter(s) monitored when stimulating the left and right ventral subclavian ansae may be the same, but the cardiac parameter(s) monitored when stimulating the right dorsal subclavian ansae may be different than the cardiac parameter(s) monitored when stimulating the left ventral subclavian ansae. For another example, the cardiac parameter(s) monitored when stimulating the left ventral subclavian ansae may be the same the cardiac parameter(s) monitored when stimulating the right dorsal subclavian ansae may be the same, but the cardiac parameter(s) monitored when stimulating the left ventral subclavian ansae may be different than the cardiac parameter(s) monitored when stimulating the right dorsal subclavian ansae.

Referring again to FIG. 2A, once the neuromodulation element 232 is positioned in the left subclavian artery 202, non-therapeutic stimulation can be applied to locate the dorsal subclavian ansae 204 and/or the ventral subclavian ansae 206 by achieving a target increase in cardiac function. For example, an increase in heart rate (e.g., an increase of about 5% to about 30% (e.g., about 5%, about 10%, about 15%, about 20%, about 25%, about 30%, ranges between such values, and the like)) can indicate that the sympathetic nervous system is being stimulated. For another example, an increase in a cardiac parameter (e.g., increase in heart rate (R-R interval shortening), increase in systemic blood pressure, increase in left ventricular contractility, increase in ventricular developed pressure (dP/dt), shortening of P-R interval and Q-T interval, shortening of effective refractory period/activation recovery intervals of the atria and/or ventricle, induction of atrial tachyarrhythmias or ventricular tachyarrhythmias that can be stopped by cardioversion or electric shock, combinations thereof, and the like) can indicate that the sympathetic nervous system is being stimulated. Once the subclavian ansae 204, 206 have been located by the non-therapeutic stimulation, the neuromodulation element 232 can be used to therapeutically ablate or denervate the subclavian ansae 204, 206. In some embodiments, the neuromodulation element 232 includes multiple modalities (e.g., a first modality for stimulating the subclavian ansae 204, 206 and a second modality for ablating the subclavian ansae 204, 206). For example, the neuromodulation element 232 can include an array of electrodes configured to provide electrical stimulation and a different array of electrodes configured to provide radiofrequency ablation. For example, the neuromodulation element 232 can include an array of electrodes configured to provide electrical stimulation and a cryogenic ablation device. In some embodiments, the neuromodulation element 232 includes a single modality (e.g., configured to stimulate the subclavian ansae 204, 206 based on a first set of stimulation parameters and configured to ablate the subclavian ansae 204, 206 based on a second set of ablation parameters). For example, the neuromodulation element 232 can include an array of electrodes configured to provide electrical stimulation (e.g., in a bipolar mode in which one or more electrodes act as a cathode and one or more electrodes act as an anode) and configured to provide radiofrequency ablation (e.g., using one or more electrodes in a monopolar mode). The ablation, and not mere stimulation, of the subclavian ansae 204, 206, can provide long term effects. For clarity, the ablation signals are destructive signals that are not reversible in the short run (e.g., it is possible that the nerves may grow back after many years). The ablation is selective by use of a percutaneous catheter 230, and is not surgical stellectomy. The ablation described herein preferably does not target the stellate ganglia in some embodiments. The ablation is preferably from within the subclavian artery, and not, for example due to accessing the paravertebral gutter.

The dorsal subclavian ansae 204 and the ventral subclavian ansae 206 may be separately stimulated and/or ablated. A possible advantage of this approach is to enable mapping and discrete localization of the nerves, visualized with biomarker change superimposed over the anatomical mapping, like CARTO mapping. In some embodiments, less than 360° of tissue around the left subclavian artery is ablated. This is in contrast, for example, to renal denervation that aims to fully ablate all of the tissue around the renal arteries and stellectomy that removes all of the nerves around the subclavian artery. More specific ablation of only the dorsal subclavian ansae 204 and/or the ventral subclavian ansae 206 can reduce side effects (e.g., sensory deficits (like hyperalgesia) and/or sudomotor abnormalities can be avoided) compared to more complete ablation by targeting the heart-feeding nerves and avoiding nerves and other tissue related to the head, neck, and other body parts. In certain embodiments, the dorsal subclavian ansae 204 and the ventral subclavian ansae 206 may be stimulated at the same time or simultaneously and/or ablated at the same time or simultaneously. For example, in certain embodiments, the dorsal subclavian ansae 204 and the ventral subclavian ansae 206 are stimulated separately but ablated at the same time (or a portion of the same time) or simultaneously. A possible advantage of this approach is to enable mapping and discrete localization of the nerves but using simultaneous ablation of the dorsal subclavian ansae 204 and the ventral subclavian ansae 206 so as to reduce treatment time.

Figure 2B:
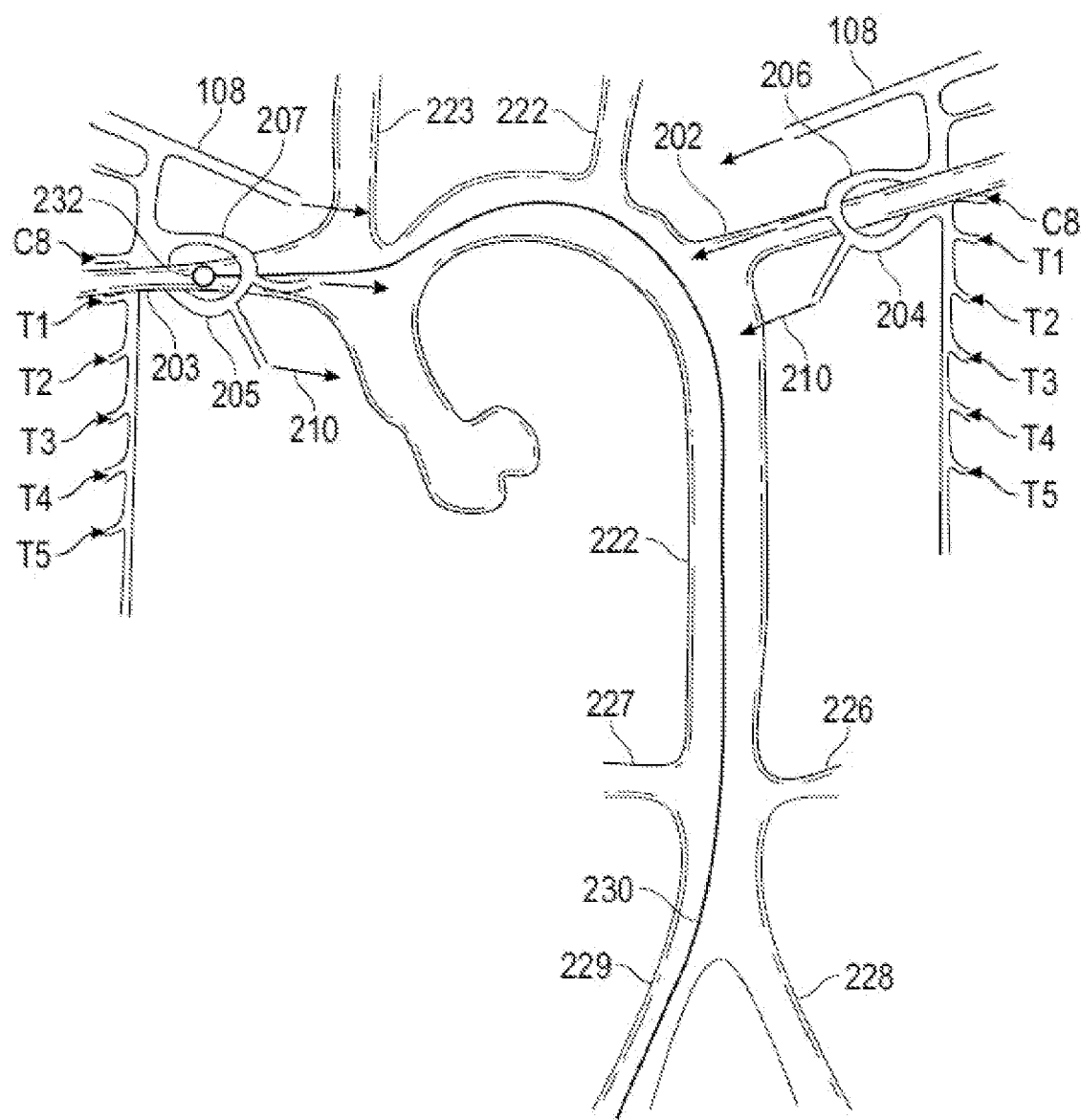
FIG. 2B is a schematic diagram of an example method of modulating nerves around a right subclavian artery.

FIG. 2B is a schematic diagram of an example method of modulating nerves 205, 207 around a right subclavian artery 203. The method may be similar to or the same as the method of modulating the nerves 204, 206, except that the catheter 230, which can be the same catheter or a different catheter than shown and described with respect to FIG. 2A, has been positioned in the right subclavian artery 203 (e.g., a position in the right subclavian artery 203 surrounded by the dorsal subclavian ansae 204 and the ventral subclavian ansae 206). As illustrated in FIG. 2B, the catheter 230 has been navigated from an access site in the lower body, such as the right femoral artery, to the right subclavian artery 203. The catheter 230 can be tracked over a guidewire, tracked through a guide catheter, directly navigated, and/or other methods of navigation. In some embodiments in which the same catheter 230 is used for treatment around both the left subclavian artery 202 and the right subclavian artery 203, the catheter 230 can be repositioned without withdrawing the catheter 230 from the body. For example, a first guidewire can be navigated to the left subclavian artery 202 and the catheter 230 can be tracked over the first guidewire. The first guidewire can remain in place during treatment around the left subclavian artery 202, partially retracted, or fully retracted. Once the treatment around the left subclavian artery 202 is complete, the first guidewire can be advanced and navigated to the right subclavian artery 203. If the first guidewire was fully retracted, the first guidewire or a second guidewire can be advanced through the catheter 230. The catheter 230 can be advanced over the repositioned first guidewire or the second guidewire in the right subclavian artery 203. The right subclavian artery 203 may be treated before the left subclavian artery 202 or vice versa.

If two catheters 230 are used, the treatment of the right subclavian artery 203 and the left subclavian artery 202 may be at least partially simultaneous. For example, a first catheter 230 can extend from a right radial access point to the right subclavian artery 203 and a second catheter 230 can extend from a left radial access point to the left subclavian artery 202. The first and second catheters can be the similar or different (e.g., comprising a different size, a different neuromodulation element 232, etc.).

In some embodiments, the subclavian ansae ablation is unilateral (only the left dorsal subclavian ansae 204 and/or the left ventral subclavian ansae 206, or only the right dorsal subclavian ansae 205 and/or the right ventral subclavian ansae 207). In some embodiments, the subclavian ansae ablation is bilateral (the left dorsal subclavian ansae 204 and/or the left ventral subclavian ansae 206, and the right dorsal subclavian ansae 205 and/or the right ventral subclavian ansae 207). This provides at least four degrees of freedom to tailor a treatment for a particular result and/or subject. As with the left subclavian artery 202, in some embodiments, the right dorsal subclavian ansae 205 and the right ventral subclavian ansae 207 can be stimulated at the same time or simultaneously and/or ablated at the same time or simultaneously. For example, in certain embodiments, the right dorsal subclavian ansae 205 and the right ventral subclavian ansae 207 can be stimulated separately but ablated at the same time (or a portion of the same time) or simultaneously. A possible advantage of this approach is to enable mapping and discrete localization of the nerves while using simultaneous ablation of the right dorsal subclavian ansae 205 and the right ventral subclavian ansae 207 so as to reduce treatment time.

Figure 3:
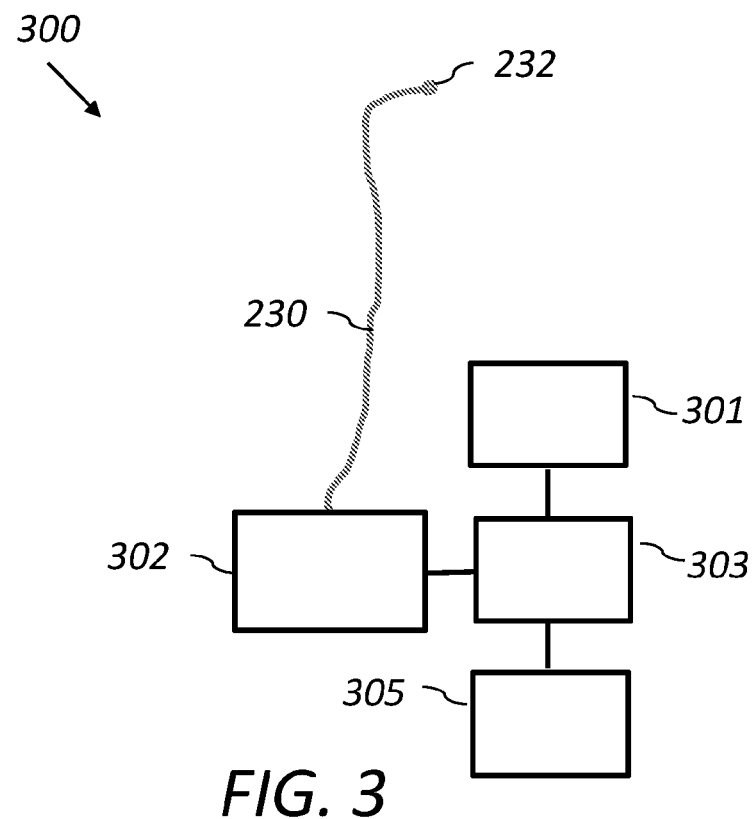
FIG. 3 is a schematic diagram of an example system for modulating nerves.

FIG. 3 is a schematic diagram of an example system 300 for modulating nerves. The system 300 comprises the catheter 230, which comprises the neuromodulation element 232, and a signal generator 302. The signal generator can be an external signal generator, an internal signal generator (e.g., the signal generator 302 can be externally powered via inductive coupling), or a signal generator with components split between both internal and external. The signal generator 302 can comprise wired or wireless communication (e.g., configured to communicate with the neuromodulation element 232, a hospital system, a computer, a handheld device such as a phone or tablet, etc.). The system 300 can also include a control system/controller 301 that can include a processor for controlling one or more operations of the system 300 as described herein, a display 303 for displaying information as described herein and a computer interface 305 which can be used to input information to the control system/controller 301.

If the neuromodulation element 232 comprises electrodes, the signal generator 302 can generate an electrical signal configured for non-therapeutic SAS. For example, non-therapeutic SAS can include monopolar, bipolar, or multipolar stimulation using a pulse width between about 0.05 milliseconds (ms) and about 3 ms (e.g., about 0.05 ms, about 0.1 ms, about 0.25 ms, about 0.5 ms, about 0.75 ms, about 1 ms, about 1.5 ms, about 2 ms, about 2.5 ms, about 3 ms, ranges between such values, etc.), a frequency between about 0.1 hertz (Hz) and about 150 Hz (e.g., about 0.1 Hz, about 1 Hz, about 5 Hz, about 10 Hz, about 25 Hz, about 50 Hz, about 75 Hz, about 100 Hz, about 125 Hz, about 150 Hz, ranges between such values, and the like), and an amplitude between about 0.1 milliamperes (mA) and about 30 mA (e.g., about 0.1 mA, about 1 mA, about 2.5 mA, about 5 mA, about 10 mA, about 15 mA, about 20 mA, about 25 mA, about 30 mA, ranges between such values, and the like). The signal may include a charge balanced wave, a symmetrical wave, and/or an asymmetrical wave (e.g., using 2:1 recharge pulse width or active first phase with a passive recharge phase), with a duration based on capacitance coupled to ground. Duty cycle may be dependent on hysteresis or the cardiac system (e.g., stimulation induced R-R shortening). The duration of stimulation may be less than 1 second or greater than 30 seconds. Recovery time can be seconds or minutes, after which the stimulation can be repeated if desired.

The signal generator 302 can also or alternatively generate signals configured for ablation. Tissue denervation occurs above 50° C. A variety of modalities can be employed for ablation of the subclavian ansae including, for example, radiofrequency (RF), high power short duration RF (HPSD RF), cryoablation (CB), microwave, high-intensity focused ultrasound (HIFU), electroporation, combinations thereof, and others. RF energy to produce RF ablation may be generated at frequencies between about 50 (kilohertz) kHz and about 1,500 kHz (e.g., about 500 kHz, about 100 kHz, about 250 kHz, about 350 kHz, about 400 kHz, about 450 kHz, about 500 kHz, about 600 kHz, about 750 kHz, about 1,000 kHz, about 1,500 kHz, ranges between such values, and the like) and using about 10 watts (W) to about 60 W (e.g., about 10 W, about 20 W, about 30 W, about 40 W, about 50 W, about 60 W, ranges between such values, and the like) of power over a specific time window, such as between about 15 s and about 90 s (e.g., about 15 s, about 20 s, about 30 s, about 40 s, about 50 s, about 60 s, about 75 s, about 90 s, ranges between such values, and the like). A majority of the lesions occurs as a result of conductive heat, which is inversely proportional to the distance from the tip of the electrode. HPSD RF uses higher power and shorter durations. For example, HPSD RF may use power between about 50 W and about 90 W (e.g., about 50 W, about 90 W, ranges between such values, and the like) and a duration between about 4 s and about 15 s (e.g., about 4 s, about 15 s, ranges between such values, and the like). The principle of high power short duration ablation seeks to change the balance between resistive and conductive energy transfer and improve the durability of the tissue damage. Before the creation of RF ablation, direct current or DC ablation created cell injury primarily by electroporation or thermal injury. Electroporation can be applied using energies greater than about 200 joules (J) applied for milliseconds. CB involves three phases of tissue damage. The first occurs during delivery of the CB and is known as the freezing-thawing phase. As the temperature drops below −15° C., microscopic extracellular ice formation occurs, followed by intracellular ice formation when the temperature drops below −40° C. and results in localized tissue damage. As thawing occurs, there is fusion of the ice crystals with microthrombi and platelet aggregation. Subsequently, the hemorrhagic-inflammatory phase occurs with localized tissue inflammation and oedema, and, finally, the replacement-fibrosis phase takes place and a fibrotic scar develops. The signal generator can accommodate all of these settings and timing as needed for complete ablation and denervation of the subclavian ansae. CB can used in the subclavian artery to ablate the subclavian ansae using tissue cooling and the Joule Thompson effect and circulating rare noble gases like argon, helium, etc. Cryoprobes can be used with circulating cryogen.

Figure 4:
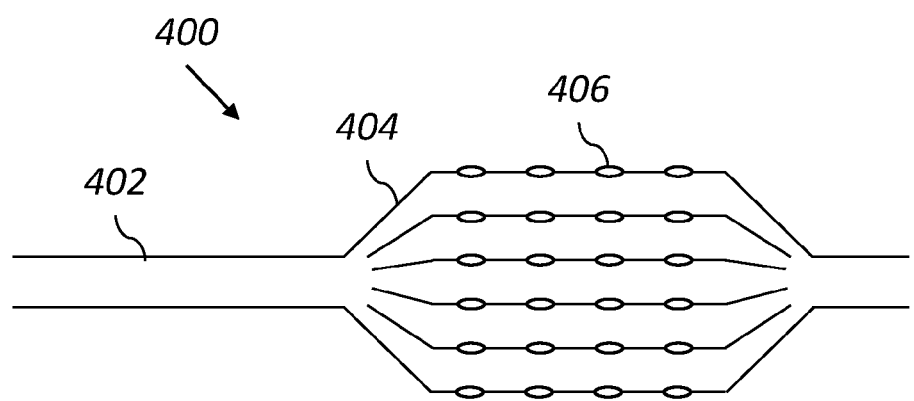
FIG. 4 is a schematic diagram of an example neuromodulation element.

FIG. 4 is a schematic diagram of an example neuromodulation element 400. The neuromodulation element 400 is positioned at a distal portion of a catheter 402 which can also be referred to as an elongate element. The neuromodulation element 400 comprises a plurality of struts 404 and a plurality of electrodes 406 coupled to the struts 404. The term struts should not be limited to material left after cutting from a tube, and can include filaments woven together, strips of material joined together (e.g., at proximal and distal ends), tubular elements, combinations thereof, and the like. The electrodes 406 may be coupled directly to the struts 404 (e.g., as schematically shown in FIG. 4) or part of an electrode assembly that is coupled to the struts 404. Combinations of the electrodes 406 can be used to provide electrical stimulation to the subclavian ansae. Multiple electrodes (as shown in FIG. 4) can be referred to as an array of electrodes 406. For example, one or more of the electrodes 406 could be used as an anode and one or more of the electrodes 406 could be used as a cathode. If the electrical stimulation shows nerve capture, the same combination of electrodes 406 could be used with different parameters to ablate the nerve.

Figure 5:
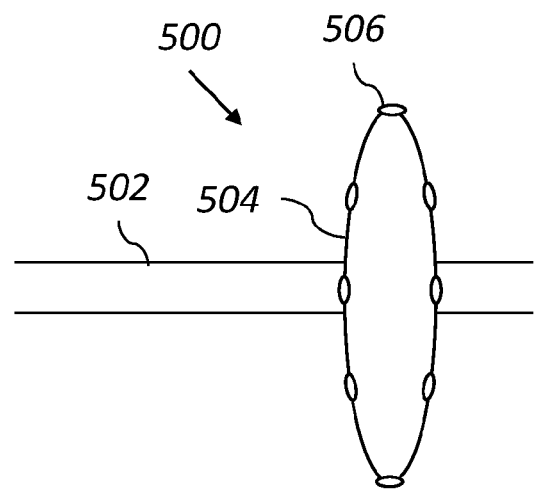
FIG. 5 is a schematic diagram of another example neuromodulation element.

FIG. 5 is a schematic diagram of another example neuromodulation element 500. The neuromodulation element 500 is positioned at a distal portion of a catheter 502. The neuromodulation element 500 comprises a loop 504 and a plurality of electrodes 506 coupled to the loop 504. The term loop should not be limited to a circular or arcuate member, and can include a spiral, a partially arcuate member, combinations thereof, and the like. The electrodes 506 may be coupled directly to the loop 504 (e.g., as schematically shown in FIG. 5) or part of an electrode assembly that is coupled to the loop 504. A separate neuromodulation element may be used for SAS prior to ablation. In some embodiments, it is possible to stimulate with cryoenergy upon initial cooling, which may be very localized and for a short duration. Once a position of the target tissue has been identified, cryogenic energy can be applied to the electrodes 506 to ablate tissue around the loop 504.

Figure 6:
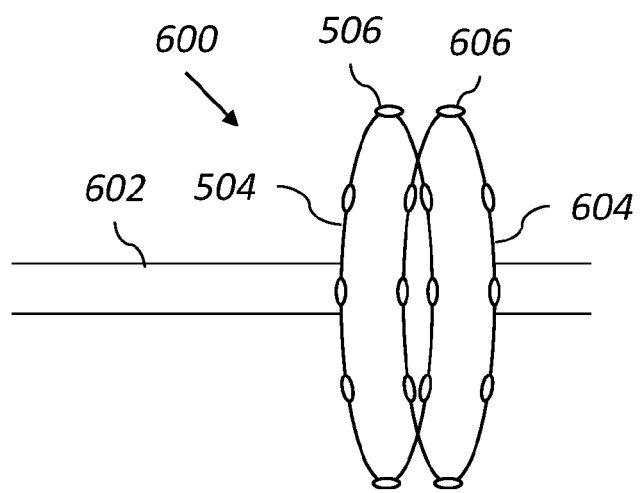
FIG. 6 is a schematic diagram of another example neuromodulation element.

FIG. 6 is a schematic diagram of another example neuromodulation element 600. The neuromodulation element 600 is positioned at a distal portion of a catheter 602. Like the neuromodulation element 500, the neuromodulation element 600 comprises a loop 504 and a plurality of electrodes 506 coupled to the loop 504 that are configured to apply cryogenic energy to ablate tissue around the loop 504. The neuromodulation element further comprises a second loop 604 and a second plurality of electrodes 606. The electrodes 606 may be coupled directly to the loop 604 (e.g., as schematically shown in FIG. 6) or part of an electrode assembly that is coupled to the loop 604. Combinations of the electrodes 606 can be used to provide electrical stimulation to the subclavian ansae. For example, one or more of the electrodes 606 could be used as an anode and one or more of the electrodes 606 could be used as a cathode. If the electrical stimulation shows nerve capture, a corresponding combination of electrodes 506 could be used to ablate the nerve with cryogenic energy. The loops 504, 604 are close enough together that the small distance does not negatively affect the position of the ablation even though shifted slightly from the position of the captured nerve. In some embodiments, the distance between the loops is between about 0 mm (e.g., touching) and about 3 mm (e.g., about 0 mm, about 0.5 mm, about 1 mm, about 1.5 mm, about 2 mm, about 2.5 mm, about 3 mm, ranges between such values, etc.). In some embodiments, upon identifying the position of the target tissue with the loop 604, the catheter 602 is distally advanced by a known distance between the loops 504, 604 such that the ablation electrodes 506 are in the same position as the stimulation electrodes 606. For example, a handle of the catheter 602 can include a slider in a channel that, when distally advanced, distally advances the catheter 602 and/or the neuromodulation element 600 by the distance.

Figure 7:
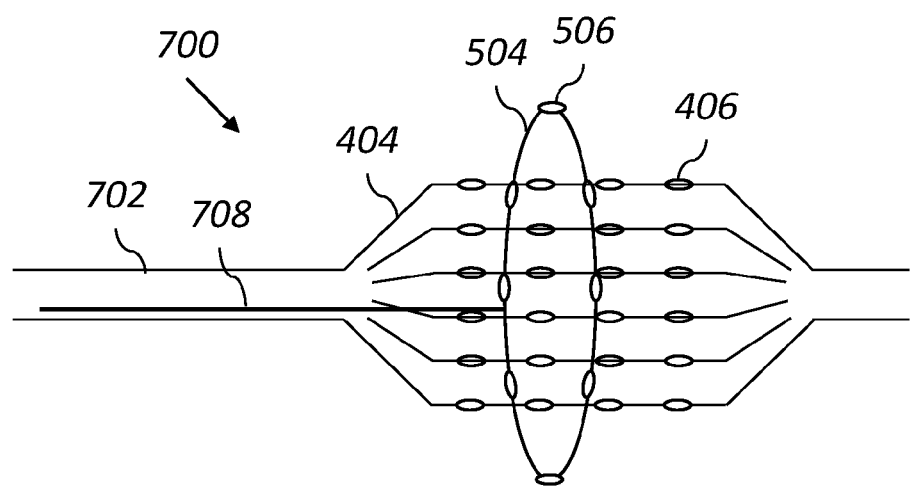
FIG. 7 is a schematic diagram of another example neuromodulation element.

FIG. 7 is a schematic diagram of another example neuromodulation element 700. The neuromodulation element 700 is positioned at a distal portion of a catheter 702. Like the neuromodulation element 400, the neuromodulation element 700 comprises a plurality of struts 404 and a plurality of electrodes 406 coupled to the struts configured to apply SAS. Like the neuromodulation element 500, the neuromodulation element 700 comprises a loop 504 and a plurality of electrodes 506 coupled to the loop 504 that are configured to apply cryogenic energy to ablate tissue around the loop 504. Combinations of the electrodes 406 can be used to provide electrical stimulation to the subclavian ansae. If the electrical stimulation shows nerve capture, the loop 504 can be longitudinally and/or rotationally moved into position such that cryogenic energy applied to selected electrodes 506 can ablate the tissue. The catheter 702 may comprise, for example, a tether 708 configured to longitudinally move and/or rotationally orient the loop 504 and thereby the electrodes 506.

Figure 8:
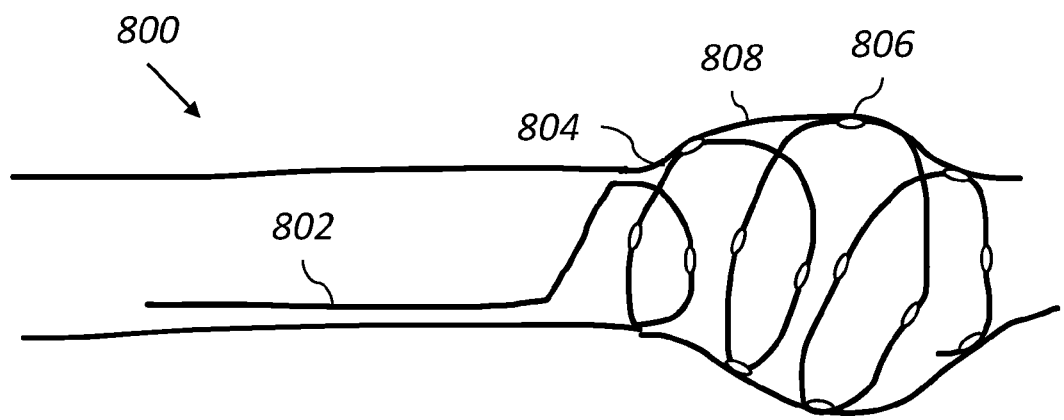
FIG. 8 is a schematic diagram of another example neuromodulation element in a vessel.

FIG. 8 is a schematic diagram of another example neuromodulation element 800 in a vessel 808 (e.g., an artery such as a subclavian artery). The neuromodulation element 800 is positioned at a distal portion of a catheter 802. The neuromodulation element 800 comprises a corkscrew or helix 804 and a plurality of electrodes 806 coupled to the loop corkscrew 804. The electrodes 806 may be coupled directly to the corkscrew 804 (e.g., as schematically shown in FIG. 8) or part of an electrode assembly that is coupled to the corkscrew 804. The corkscrew 804 may be configured to dilate a wall of an artery 808 (e.g., as shown in FIG. 8), for example to decrease the distance between the electrodes 806 in the artery 808 and the nerve of interest, to provide additional targeting, and/or to provide isolation. A separate neuromodulation element may be used for SAS prior to ablation. Once a position of the target tissue has been identified, energy can be applied to the electrodes 806 to ablate tissue around the corkscrew 804.

Figure 9:
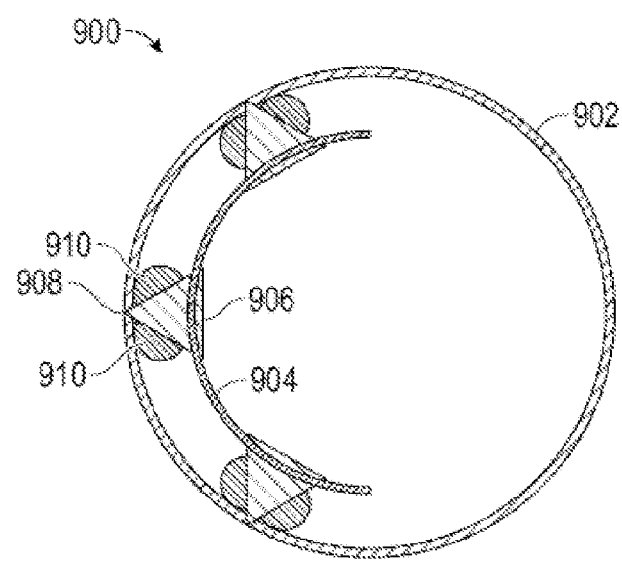
FIG. 9 is a schematic end or cross-sectional view of an example neuromodulation element in a vessel.

FIG. 9 is a schematic end or cross-sectional view of an example neuromodulation element 900 in a vessel 902 (e.g., an artery such as a subclavian artery). The neuromodulation element 900 may be compatible with a stimulation and/or ablation element as described herein with respect to FIGS. 4-8 or any other stimulation and/or ablation element. The neuromodulation element 900 comprises a backbone 904 and a plurality of electrodes 906 coupled to the backbone 904. The backbone 904 may comprise, for example, a strut, a loop, a corkscrew, etc. The electrodes 906 comprise a base 908 having a triangular shape. The shape of the base 908 is configured to push the tip of the electrode 906 into the vessel wall. The electrodes 906 optionally further comprise one or a plurality of electrode bumps 910 (e.g., located on each side of the tip), for example to spread out energy and/or push the electrode 906 into the tissue contact.

Figure 10:
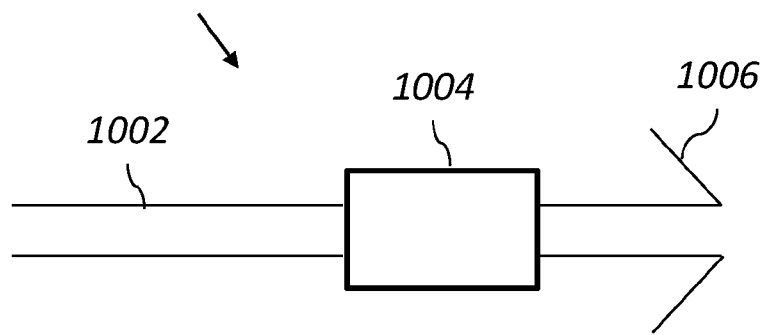
FIG. 10 is a schematic diagram of another example neuromodulation element.

FIG. 10 is a schematic diagram of another example neuromodulation element 1000. The neuromodulation element 1000 is positioned at a distal portion of a catheter 1002 which can also be referred to as an elongate element. The neuromodulation element 1000 may comprise a stimulation and/or ablation element 1004 (e.g., as described herein with respect to FIGS. 4-9) or any other stimulation and/or ablation element. For example, a catheter may comprise a plurality of spokes including electrode pads that cover specific radial positions (e.g., with respect to a clock face, 2:00 to 3:00, 3:00 to 4:00, etc.), which can enable selective stimulation of subclavian ansae. The neuromodulation element 1000 further comprises a distal protection device 1006. The distal protection device 1006 may comprise, for example, a filter having a distal-facing mouth configured to catch clots, thrombus, emboli, and/or any other material that might be created during SAS and/or ablation that preferably should not flow to the arm or other area of the subject. The neuromodulation element 1000, like the other neuromodulation elements described herein, preferably does not block blood flow in several embodiments.

Figure 11:
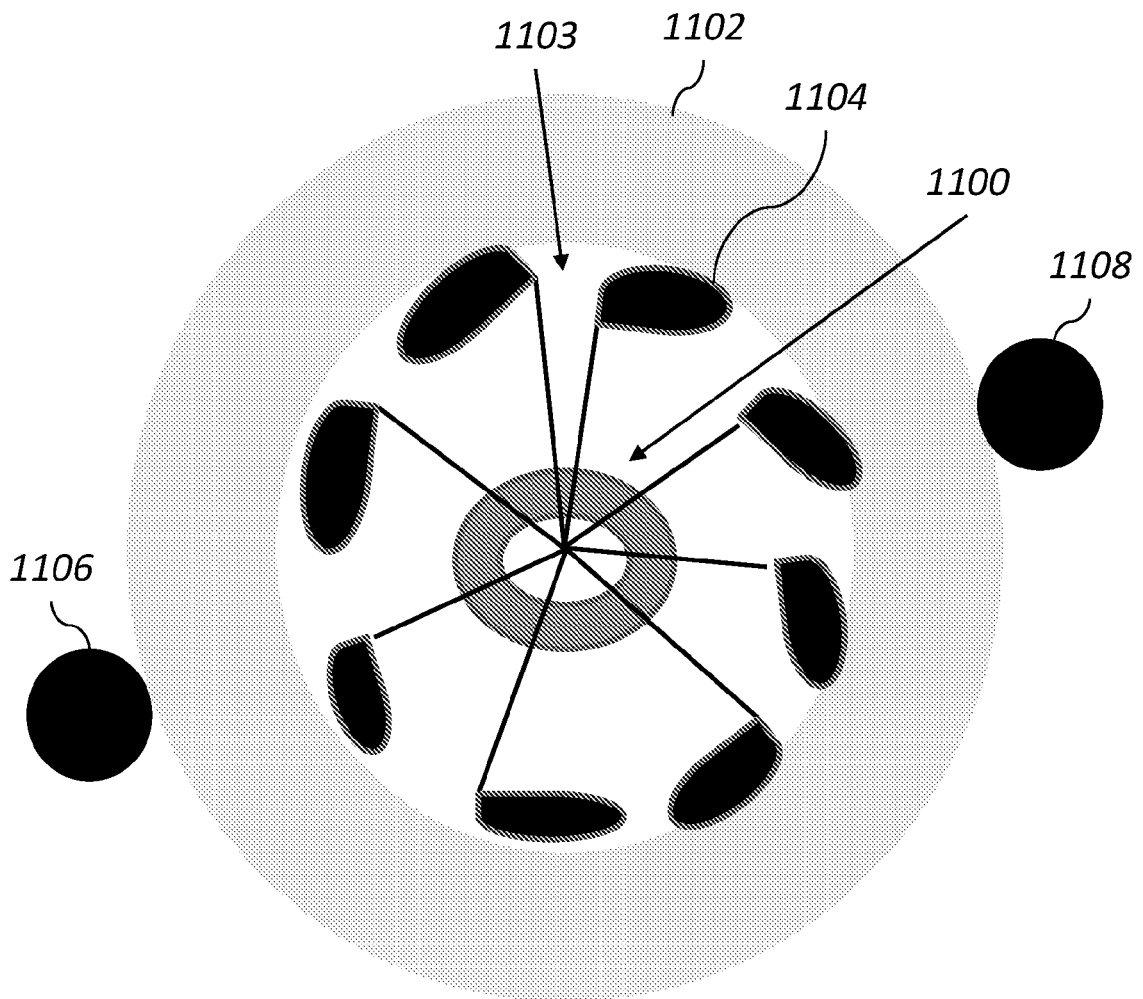
FIG. 11 schematically illustrates an end view of an example catheter in a vessel.

FIG. 11 schematically illustrates an end view of an example catheter 1100 in a vessel (e.g., a subclavian artery 1102). The catheter 1100 can be, for example, the catheter 230, 400, 500, 600, 700, 800, 900, 1000 and 1400 (discussed below). The central spline of the catheter 1100 opens in the subclavian artery 1102 in response to operator adjustments on the catheter control to expose the electrode contacts 1104 that radially splay out and remain in close approximation to the wall of the subclavian artery 1102. This close approximation determines the ability to stimulate the lumen 1103 of the subclavian artery 1102 at selected electrode contacts 1104 for determination of location of dorsal subclavian ansae 1106 and ventral subclavian ansae 1108. This information is then fed to a computer that integrates the location information, the channel/electrode stimulated, the biomarker analysis, and superimposes the measured biomarker change over the anatomy of the subclavian artery 1102 as represented and separated into regions. The overlay informs the operator of the location of maximal response to SAS, thereby informing where to direct ablative energy, and enables re-checking the success of ablation with repeat SAS stimulation. This process can be repeated many times until successful ablation of all subclavian ansae 1106, 1108 nerves are achieved and as deemed satisfactory to the operator.

Figure 12:
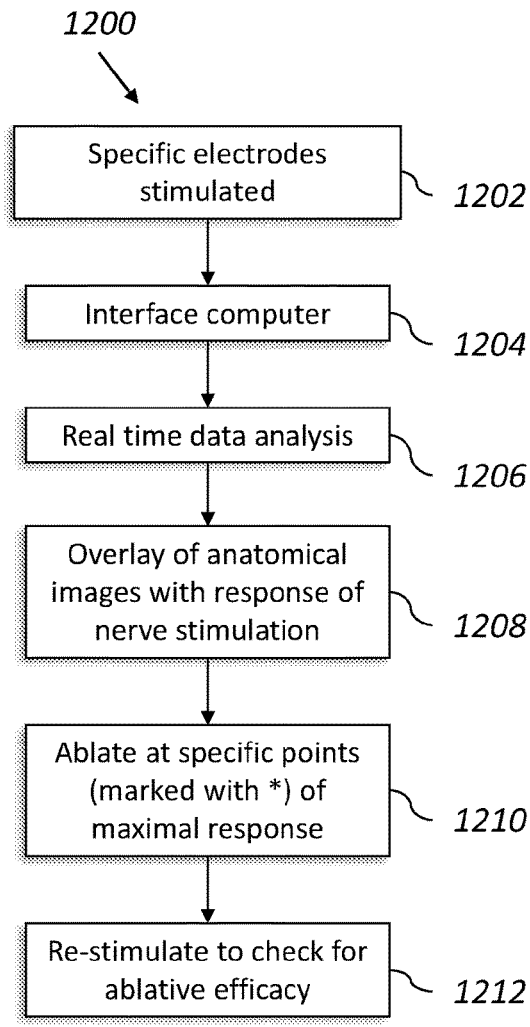
FIG. 12 is a flowchart of an example method 1100 of treating a subject.

FIG. 12 is a flowchart of an example method 1200 of treating a subject. At box 1202, specific electrodes are stimulated to provide non-therapeutic stimulation. At box 1204, the results are fed into a computer interface (e.g., automatically, manually, semi-automatically). At box 1206, real time data analysis is performed on the results. At box 1208, the computer overlays an anatomical image (e.g., schematic depiction, real ultrasound image, combinations thereof, or the like) with the response to the nerve stimulation. At box 1210, points of maximal response marked with an asterisk or some other indicia are ablated. At box 1212, the specific electrodes are re-stimulated to check for efficacy. For example, if the stimulation continues to produce a change in a cardiac parameter, that indicates that the nerve being stimulated has not been sufficiently ablated.

Figure 13:
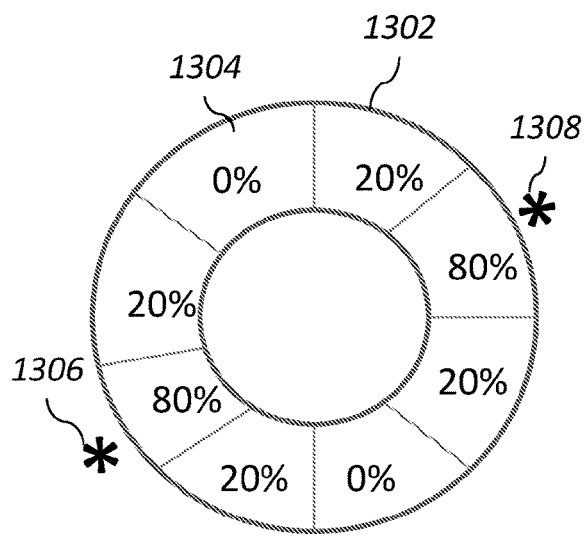
FIG. 13 is an example display that may be provided by a computer according to the method of FIG. 12.

FIG. 13 is an example display that may be provided by a computer according to the method 1200 of FIG. 12. The depiction of the subclavian artery 1302 is divided into eight radial segments 1304. The segments 1304 may be asymmetrical (e.g., as depicted in FIG. 13), for example based on the expected, known, and/or detected positions of the subclavian ansae. The segments 1304 may be asymmetrical. Although FIG. 13 illustrates eight segments 1304, more or fewer segments 1304 is also possible (e.g., depending on the number of electrodes). The computer has placed a first asterisk 1306 at a location believed to include the dorsal subclavian ansae and a second asterisk 1308 at a location believed to include the ventral subclavian ansae. The percentages displayed in the segments 1304 is a likelihood of that segment 1304 including subclavian ansae to be ablated. The segments 1304 may also or alternatively be color coded.

FIGS. 11, 12 and 13 illustrate an embodiment of a method and system that allows for identification of the ansae subclavian along the circumference of the subclavian artery. In addition to identification of the anterior and posterior ansae along the circumference, the catheter 1100 (which can be, for example, the catheter 230, 400, 500, 600, 700, 800, 900, 1000) can have electrodes both along the circumference and along the length of the catheter. For example, 5 to 20 electrodes are used in one embodiment. In such configurations, the method and system of FIGS. 11, 12 and 13 can be configured to allow for identification of the ansae subclavian along the length of the subclavian artery. For example, when the central spline of the catheter 1100 opens in the subclavian artery 1102 in response to operator adjustments on the catheter control to expose the electrode contacts 1104 that radially splay out and are longitudinally distributed along a length of the subclavian artery 1102. The overlay described above can also include an overlay of the length of the subclavian artery 1102 in addition to the circumference such that subclavian artery 1302 is divided into radial segments 1304 (e.g., eight) and longitudinal segments (e.g., two to eight longitudinal segments). Such longitudinal segments can be marked, illustrated, and incorporated into the algorithm as described above. For example, in one embodiment, the catheter 1100 can be, for example, the catheter 230, 400, 500, 600, 700, 800, 900, 1000, 1400 (discussed below). The central spline of the catheter 1100 opens in the subclavian artery 1102 in response to operator adjustments on the catheter control to expose the electrode contacts 1104 that radially splay out and also extend along a length of subclavian artery 1302 (for example, as shown in the catheter 1400 of FIG. 14A) and remain in close approximation to the wall of the subclavian artery 1102. This close approximation determines the ability to stimulate the lumen 1103 of the subclavian artery 1102 at selected electrode contacts 1104 radially and along the length of the artery for determination of location of dorsal subclavian ansae 1106 and ventral subclavian ansae 1108. This information is then fed to a computer that integrates the location information, the channel/electrode stimulated, the biomarker analysis, and superimposes the measured biomarker change over the anatomy of the subclavian artery 1102 as represented and separated into regions which can extend radially and along the length of the artery. The overlay informs the operator of the location of maximal response to SAS, thereby informing where to direct ablative energy, and enables re-checking the success of ablation with repeat SAS stimulation. This process can be repeated many times until successful ablation of all subclavian ansae 1106, 1108 nerves are achieved and as deemed satisfactory to the operator.

As noted above, FIG. 12 is a flowchart of an example method 1200 of treating a subject. At box 1202, specific electrodes are stimulated to provide non-therapeutic stimulation. At box 1204, the results are fed into a computer interface (e.g., automatically, manually, semi-automatically). At box 1206, real time data analysis is performed on the results. At box 1208, the computer overlays an anatomical image (e.g., schematic depiction, real ultrasound image, combinations thereof, or the like) with the response to the nerve stimulation. This anatomical can include radial location/segments along more than one location along the length of the artery. At box 1210, points of maximal response marked with an asterisk or some other indicia are ablated. At box 1212, the specific electrodes are re-stimulated to check for efficacy. For example, if the stimulation continues to produce a change in a cardiac parameter, that indicates that the nerve being stimulated has not been sufficiently ablated. In an embodiment, the catheter 230, 400, 500, 600, 700, 800, 900, 1000, 1400 can also be moved to a different location along the length of the artery and one or more of the actions described above can be repeated to gather additional information at a different location along the length of the artery. This process can be repeated at one more different locations.

As noted above, FIG. 13 is an example display that may be provided by a computer according to the method 1200 of FIG. 12. In embodiments, in which radial location/segments along more than one location along the length of the artery, the depiction of the subclavian artery 1302 is divided into eight radial segments 1304 and additional images can be provided similar to FIG. 13 to represent the radial segments at different locations along the length of the artery. In certain embodiments, the length of the artery over which detections are made can extend from the ostium or opening to the subclavian artery to the portion of the artery that starts to bend towards the arm. In certain embodiments, this length of artery can be divided into equal or non-equal longitudinal segments and in certain embodiments divided into 5, 6, 7, 8, 9 or 10 equal or non-equal longitudinal segments. Less or additional segments can also be used in certain embodiments. In certain embodiments the length of the artery over which detections are made can be between about 1 to 5 centimeters. The segments 1304 may be asymmetrical (e.g., as depicted in FIG. 13), for example based on the expected, known, and/or detected positions of the subclavian ansae. The segments 1304 may be asymmetrical. Although FIG. 13 illustrates eight segments 1304, more or fewer segments 1304 is also possible (e.g., depending on the number of electrodes). As mentioned above, in addition to illustrating the radial segments, more than one image such as the image of FIG. 13 can be provided to illustrate the data collected at different locations along the length of the artery. Each image can be provided with a visual indicial indicating the location along the length of the artery. In addition, in an embodiment, a three-dimensional representation of the radial segments along more than one location along the length of the artery can also be provided on the display. In an embodiment, a table or graph can also be provided to display the information. Additionally, in certain embodiments, ultrasound can be used visualize the location of the stellate ganglion and the subclavian artery. For example, in certain embodiments, a marker can be positioned on the patient such as a skin marker that is visible under fluoroscopy. This marker can be used to identify a peripheral boundary of the artery.

In the embodiments described herein the lesion or ablation patterns formed by the electrodes can have a variety of shapes such as, for example, circular, annular, cigar shaped, linear, doughnut, oval and/or spherical. In certain embodiments, the lesion width can be between 5 and 15 millimeters with a depth between 2 and 10 millimeters.

A variety of modalities may be employed for ablation of the subclavian ansae including, for example, radiofrequency (RF), high power short duration RF (HPSD RF), cryoablation (CB), microwave, ultrasound, high-intensity focused ultrasound (HIFU), electroporation, steam, laser, thermal, alcohol or other or other chemical, cryo or combinations thereof, and others and the ablation can be reversible or irreversible. RF energy to produce RF ablation may be generated at frequencies between about 50 kilohertz (kHz) and about 1,500 kHz (e.g., about 500 kHz, about 100 kHz, about 250 kHz, about 350 kHz, about 400 kHz, about 450 kHz, about 500 kHz, about 600 kHz, about 750 kHz, about 1,000 kHz, about 1,500 kHz, ranges between such values, and the like) and using about 10 watts (W) to about 60 W (e.g., about 10 W, about 20 W, about 30 W, about 40 W, about 50 W, about 60 W, ranges between such values, and the like) of power over a specific time window, such as between about 15 seconds (s) and about 90 s (e.g., about 15 s, about 20 s, about 30 s, about 40 s, about 50 s, about 60 s, about 75 s, about 90 s, ranges between such values, and the like). A majority of the lesions occur as a result of conductive heat, which is inversely proportional to the distance from the tip of the electrode. HPSD RF uses higher power and shorter durations. For example, HPSD RF may use power between about 50 W and about 90 W (e.g., about 50 W, about 90 W, ranges between such values, and the like) and a duration between about 4 s and about 15 s (e.g., about 4 s, about 15 s, ranges between such values, and the like). The principle of high power short duration ablation seeks to change the balance between resistive and conductive energy transfer and improve the durability of the tissue damage. Before the creation of RF ablation, direct current or DC ablation created cell injury primarily by electroporation or thermal injury. Electroporation can be applied using energies greater than about 200 joules (J) applied for milliseconds. CB involves three phases of tissue damage. The first occurs during delivery of the CB and is known as the freezing-thawing phase. As the temperature drops below −15° C., microscopic extracellular ice formation occurs, followed by intracellular ice formation when the temperature drops below −40° C. and results in localized tissue damage. As thawing occurs, there is fusion of the ice crystals with microthrombi and platelet aggregation. Subsequently, the hemorrhagic-inflammatory phase occurs with localized tissue inflammation and oedema, and, finally, the replacement-fibrosis phase takes place and a fibrotic scar develops. The signal generator can accommodate all of these settings and timing as needed for complete ablation and denervation of the subclavian ansae. CB can used in the subclavian artery to ablate the subclavian ansae using tissue cooling and the Joule Thompson effect and circulating rare noble gases like argon, helium, etc. Cryoprobes can be used with circulating cryogen.

FIGS. 14A-B and 15A-B illustrate an embodiment of a method and system that allows for measuring the expansion or dilation of the subclavian artery. The catheter 1400 (which can be, for example, the catheter 230, 400, 500, 600, 700, 800, 900, 1000, 1100), which can also be referred to as an elongated element, can include an expansion element 1404 that may be expanded or contracted by operator adjustments to the catheter (e.g., by the addition or removal of water or gas, or other mechanical means). In the illustrated embodiment, the expansion element can be formed in a variety of manners that provide for radial expansion of a surface of the expansion element. In certain embodiments, the expansion element can comprise a balloon which can be inflated with an inflation media. In certain embodiments, the expansion element can be mechanically expanded through the use of self-expanding stents or linkages. In an embodiment that utilizes a balloon, the inflation of the expansion element 1404 may cause the expansion element 1404 to push against the internal walls of the artery 1402, causing the artery 1402 to dilate. The deflation of the expansion element 1404 may allow the artery 1402 to contract to its original size. As described above, the catheter 1400 may also include a neuromodulation element 1401 which can be in the form of electrodes 1406 both along the length and/or the around the circumference of the catheter 1400, including along the length and around the circumference of the outer surface of expansion element 1404 which can form an array and be referred to as an array of electrodes 1406. An operator may determine whether to inflate or deflate the expansion element 1404, and to what degree, based on variety of parameters measured by the electrodes 1406. Such parameters include, but are not limited to, the diameter of the vessel, the proximity of the catheter 1400 to the nerve of interest, and tissue compliance. These dilation measurements can be used in the radial and longitudinal segmentations of the arterial wall.

Figure 14A:
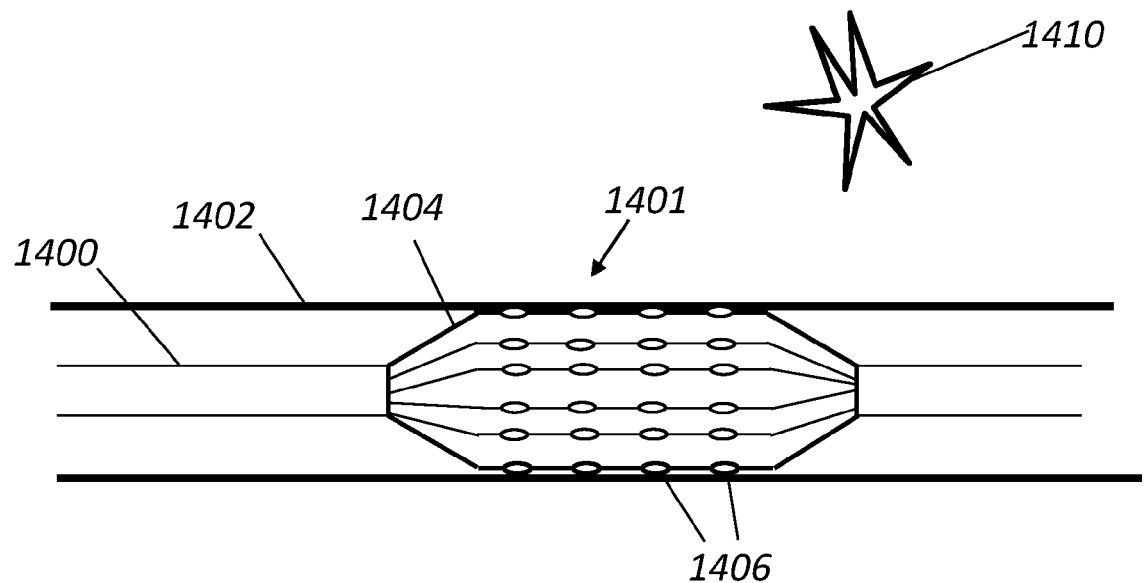
FIG. 14A schematically illustrates a side view of another example neuromodulation element in a constricted vessel.
Figure 14B:
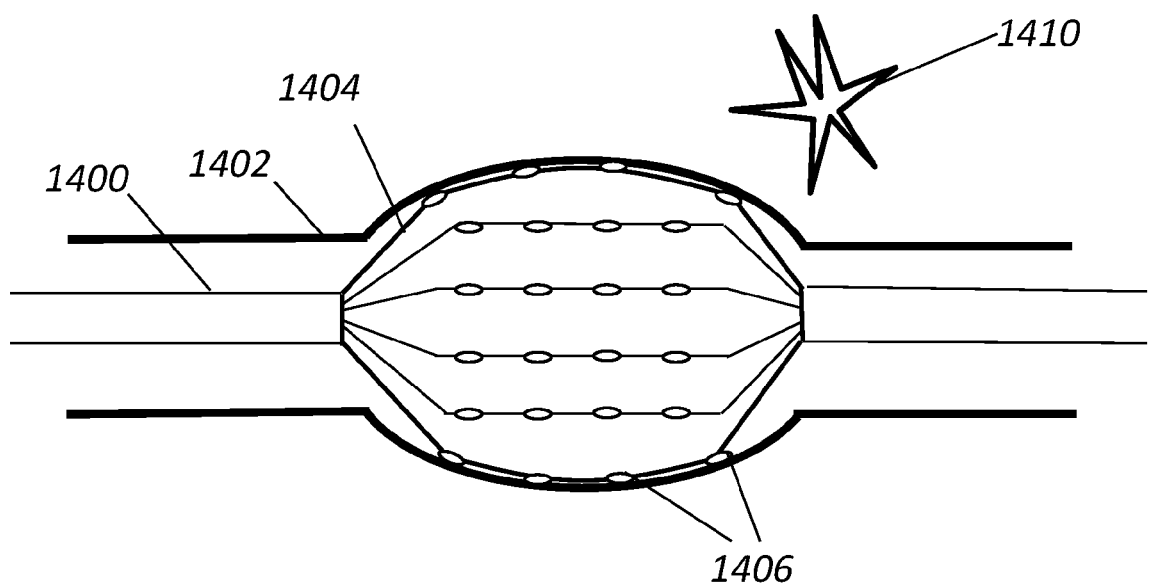
FIG. 14B schematically illustrates a side view of another example neuromodulation element in a vessel in a dilated vessel.

FIG. 14A schematically illustrates a side view of the catheter/elongate element 1400 where the expansion element 1404 that includes a neuromodulation element 1401 position on the expansion element 1404 and where the expansion element 1404 is in a partially expanded configuration within an artery 1402. The expansion element 1404 may be designed such that, in its partially expanded configuration, the electrodes 1406 of the neuromodulation element contact the inner wall of artery 1402. FIG. 14B shows a schematic side-view of the catheter 1400 where the expansion element 1404 is in an second more fully expanded configuration within the artery 1402, causing the artery 1402 to dilate. The internal diameter of artery 1402 and/or the amount of dilation may be determined by the catheter 1400 (e.g., via the electrodes and/or sensors located on radially opposite sides of the expansion element 1404).

As the expansion element 1406 expands and the artery 1402 becomes dilated, the distance between the electrodes 1406 and the nerve of interest 1410 can decrease, causing stimulation thresholds measured by the electrodes to decrease. This can allow stimulation thresholds measured by the electrodes 1406 to be used to determine the distance between the electrodes 1406 and the nerve of interest 1410. Having a smaller distance between the electrode 1406 and the nerve of interest 1410 can advantageously minimize the amount of ablation energy required and can allow for the ablation energy to be applied more specifically. In addition to utilizing stimulation thresholds, biomarker measurements as described herein can also be used to identify movement of the electrodes 1406 closer to the nerve of interest 1410. These measurements can also be made along the radial and longitudinal segmentations of the arterial wall as described above.

In some embodiments, impedance spectroscopy measurements taken by the electrodes 1406 may be used to estimate tissue compliance. This advantageously allows for ensuring that the vessel does not become overly dilated and/or damaged as the balloon member (also referred to as a balloon) 1404 is expanded in an attempt to increase the proximity of the electrodes 1406 to the nerve of interest 1410. For example, in some embodiments, if the impedance crosses (exceeds and/or drops below) a threshold value for a given frequency, a signal and/or an alarm can be provided to the user to cease expansion of the expansion element 1406 so as to not over dilate or damage the vessel. In an embodiment, if the impedance crosses (exceeds and/or drops below) a threshold value for a given frequency, the system can automatically stop expansion or decrease expansion of the expansion element 1406 so as to not over dilate or damage the vessel. Impedance spectroscopy measurement can be used to estimate the impedance of the fluid and or tissue surrounding the electrodes. As the fluid/tissue contacting the electrodes changes with expansion of the expansion element, the impedance will change. In addition, as the thickness of the tissue changes as the expansion of the expansion element increases, the impedance will also change. Using impedance spectroscopy at certain frequency, or many different frequencies can provide feedback to the system. In some embodiments, the feedback can represent how even the contact of the electrodes are to the circumference of the vessel. In other embodiment, the feedback can provide information regarding how much blood is contacting the electrodes. In yet another embodiment, the feedback from the impedance spectroscopy can provide the general location of the nerve target, as the impedance will change on those electrodes that are closest to the nerve compared to those just contacting smooth muscle, particularly when the expansion member is dilated.

Figures 15A, 15B:
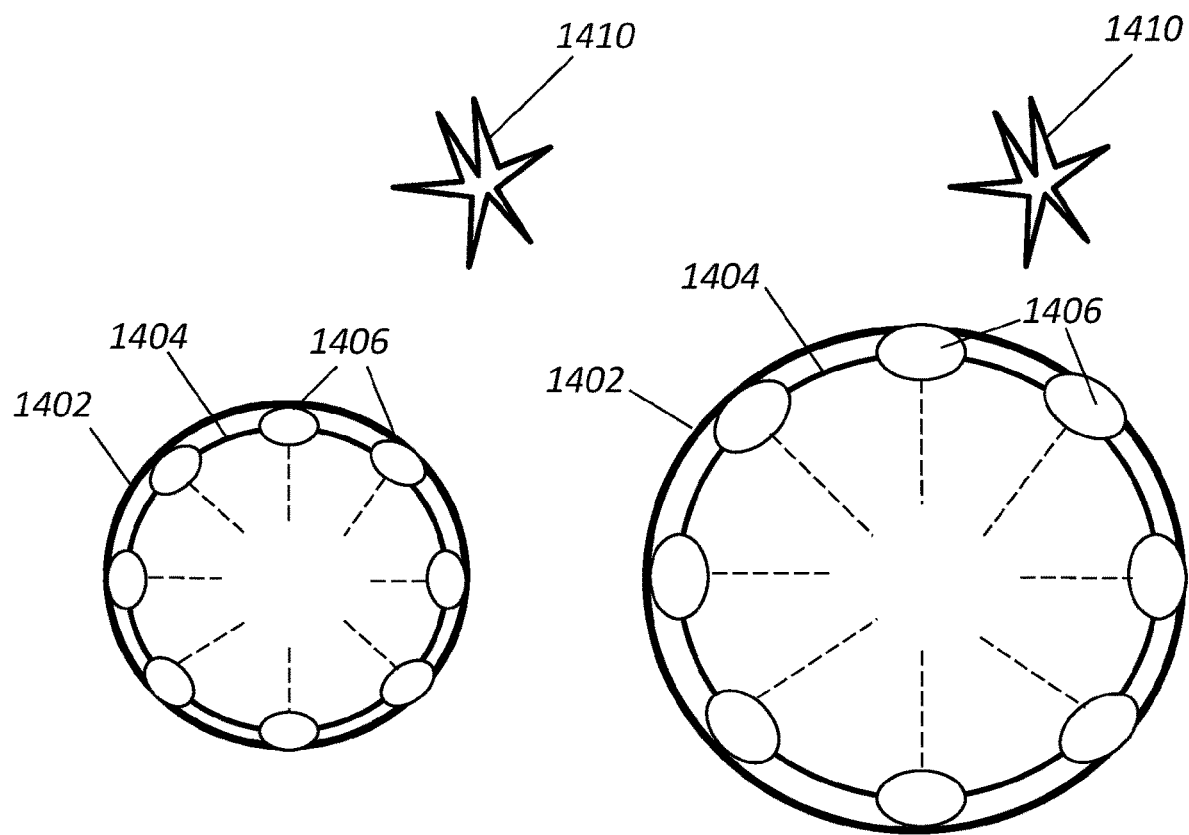
FIG. 15A is a cross-sectional view of the example neuromodulation element of FIGS. 14A-B in a constricted vessel.
FIG. 15B is s cross-sectional view of the example neuromodulation element of FIGS. 14A-B in a dilated vessel

FIG. 15A shows a cross-sectional view of the expansion element 1404 in a partially expanded configuration within the artery 1402. FIG. 15B shows a cross-sectional view of the expansion element 1404 in a second more expanded configuration within the artery 1402, causing the artery 1402 to dilate.

In some embodiments, a bespoke system for treating subclavian ansae includes one or more of the following features. The lumen of a subclavian artery is assumed to be round and dividable like a clock face. The dorsal subclavian ansae may be between about 7:00 and about 11:00 and the ventral subclavian ansae may be between about 2:00 and about 5:00, and electrodes may be concentrated at these positions. In addition, as described above, the electrodes may also be spread along the length of the catheter such that lumen of a subclavian artery can also be divided along its length in addition to being divided along its circumference. In certain embodiments, the catheter can be moved longitudinally along the length of the lumen subclavian artery to generate longitudinal divisions and/or create additional longitudinal divisions. and/or the catheter can be rotated to generate radial divisions and/or generate additional radial divisions. In certain arrangements, the combination of radial and longitudinal divisions can form a grid. The non-therapeutic stimulation along the length of the artery and/or circumference provides precise localization of the ansae, which provide the locations along the length and/or circumference for ablation. After ablation, the ansae may be restimulated to verify ablation success. Biomarkers for sympathetic simulation can include, for example, (i) Inotropic biomarkers such as, for example, developed pressure (dP/dt), arterial blood pressure (systolic, diastolic, mean), changes in pulse pressure, increase in systemic blood pressure, increase in left ventricular developed pressure (dP/dt), (ii) Chronotropic biomarkers, such as, for example, heart rate changes (changes in R_R or Q_Q intervals on surface ECG), increase in heart rate (R-R interval shortening), changes in basal cycle length on intracardiac electrograms, (iii) Dromotropic biomarkers, such as, for example, changes in PR intervals (index of heart rate and changes in AV conduction times), changes in QT intervals (index of changes in ventricular excitation, increased Activation recovery intervals with denervation/ablation (measured with intracardiac electrograms in EP lab), changes in QT variability, changes in Tpeak-Tend intervals, increases in atrial and ventricular refractory periods with denervation/neural signal blocking, reduced arrhythmogenic inducibility as evidenced by testing with S1-S2 stimulation pulse trains, increase in left ventricular contractility, shortening of P-R interval and/or Q-T interval, shortening of effective refractory period/activation recovery intervals of the atria and/or ventricle, induction of atrial tachyarrhythmias, and/or ventricular tachyarrhythmias that can be stopped by cardioversion or electric shock), (iv) Lusitropic biomarkers, such as, for example, negative differentiated function of developed pressure, and changes in basal slopes of Pressure-volume loops, (v) Inflammatory biomarkers such as, for example, reduction in inflammatory markers—changes in CRP (blood and tissue), local tissue TNF alpha levels, reduction in inflammasome levels, changes in leukotriene and prostaglandin levels or its precursors, reduction in 3-nitrotyrosine levels in myocardial or tissue biopsies. For some biomarkers, the ablation may produce the opposite effect at baseline, for example marginal decrease in basal heart rate, mild drop in arterial pressure, little to no change in left ventricular contractility, and/or prolong effective refractory periods. If the restimulation check does not produce the same changes to the biomarkers for sympathetic stimulation, that suggests successful ablation. Thus, in certain applications, the location of the catheter 1110 within the subclavian artery is confirmed, then stimulation is conducted to identify the ansae, a cardiac biomarker is then identified, and then a denervation procedure (for example, ablation) of the ansae is performed. Once the denervation procedure is complete, the results can be confirmed, by applying stimulation again, and showing that the biomarker is no longer changing with stimulation. Denervation, such as ablation, may be partial or full, and may be reversible or permanent.

In some embodiments, the controller 301 can employ machine learning algorithms which can be used to set-up and/or automatically adjust the stimulation applied by the catheter and/or to analyze the cardiac parameters and/or biomarkers that are being monitored. In some embodiments, the machine learning algorithm can adjust stimulation parameters (power, duration, amplitude) as a result of the cardiac parameters and/or biomarkers that are being monitored and/or in combination with cardiac parameters and/or biomarkers that are being monitored after ablating the targeted nerve. In some embodiments, training of the machine learning algorithm results in a determinization of typical locations, stimulation parameters, ablation parameters, cardiac parameters and/or biomarkers.

In some embodiments, the catheter, for example, the catheter 230, 400, 500, 600, 700, 800, 900, 1000, 1400 (discussed below), can be actuated by a robotic control system and/or have functions that are automatically or semi-automatically controlled. For example, in certain embodiments, longitudinal movement and/or rotation of the catheter can be controlled by a robot with linear and/or rotational actuators. Bending and expansion at the distal end of the catheter can also be controlled by a robotic system. In one example embodiment, movement and motion of the catheter can be automatically controlled by the robot system to gather data as described above along radial and longitudinal divisions of the artery. Once information is gathered, the robot system can automatically or semi-automatically move the neuromodulation element to the designated or targeted regions so as to perform ablation as described herein.

Figure 16:
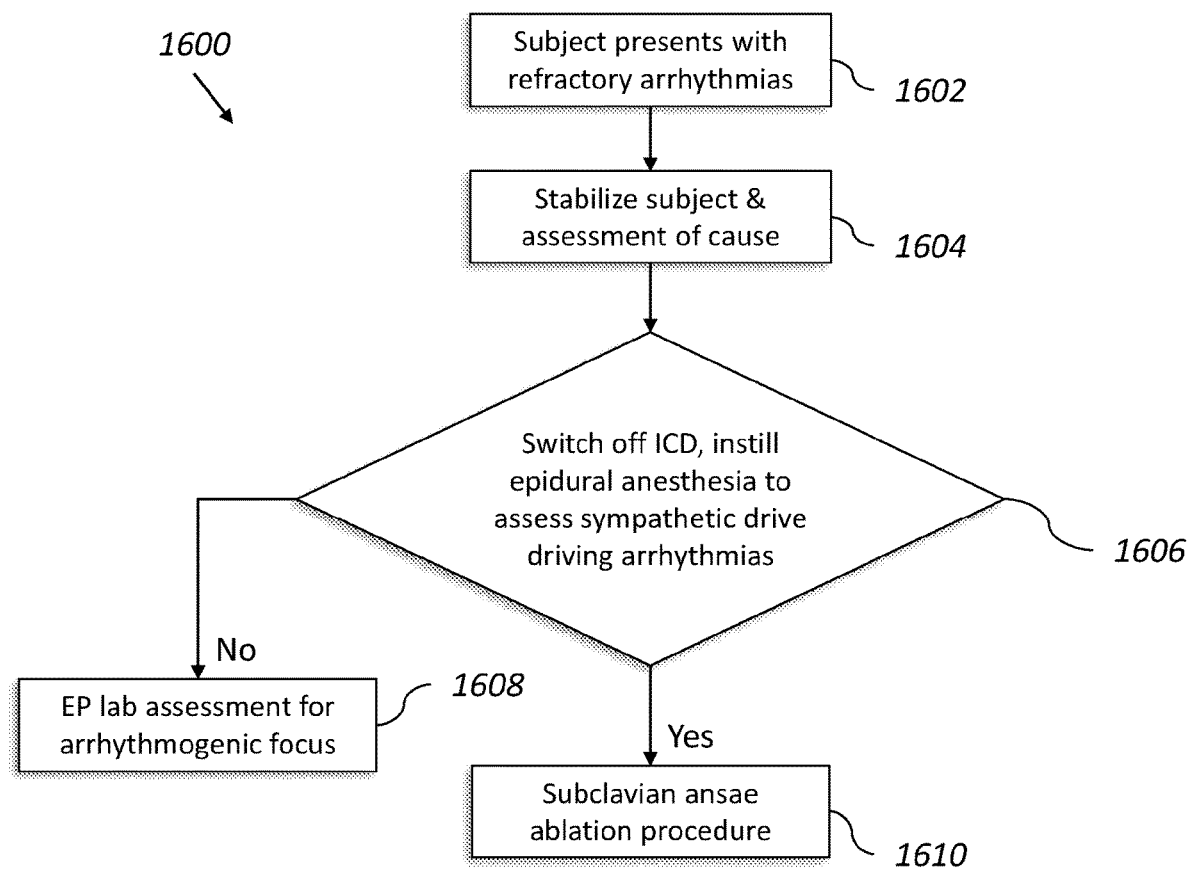
FIG. 16 is a flowchart of another example method of treating a subject.

FIG. 16 is a flowchart of another example method 1600 of treating a subject. At box 1602, a subject presents with refractory arrhythmias. At box 1604, the subject is stabilized that the cause of the refractory arrhythmias is assessed. At box 1606, any ICD is switched off, and epidural anesthesia is instilled to assess whether sympathetic drive is driving the arrhythmias. If sympathetic drive is not driving the arrhythmias, then an electrophysiology laboratory (EP lab) assesses the arrhythmogenic focus at box 1608. If sympathetic drive is driving the arrhythmias, then a subclavian ansae ablation procedure (e.g., as described herein) is performed at box 1610.

The present disclosure relates to neuromodulation and ablation of a subject's subclavian ansae to treat heart disease. Heart disease can refer to ventricular arrythmias, atrial fibrillation, ventrical tachycardia, ventrical fibrillation, congestive heart failure, and atrial flutter. In addition, the method and system described for neuromodulation (such as ablation) of a subject's subclavian ansae can also be used to treat other conditions or diseases. For example, an aspect of the present disclosure is the recognition that stellate ganglion block or denervation, or subclavian ansae ablation can also impact hemodynamic function. In some applications, sympathetic activation with pharmacological agonists or nerve stimulation can change heart rate, contractility, conduction and relaxation. In one embodiment, targeted sympathetic denervation/decentralization or block can lead to improvement in diastolic properties of the heart. Specifically, any impact in improving compliance of the left ventricle that precipitates in reduction of afterload is achieved in some embodiments. This increased compliance can positively impact stroke volume and increased cardiac output as a result. Accordingly, stellate block using neuromodulation such as ablative methods as proposed herein can lead to improvements in indices of diastolic function as measured by end-systolic meridonal wall stress, change in peripheral vascular resistance, an increase in end diastolic volume and increased stroke volume and/or cardiac output. This can happen with or without measurable change in heart rate due to direct sympathetic effect on cardiac muscle, independent of the dromotropic effect.

Ablation may also be performed without stimulation before and/or after the ablation. For example, the ablation can be all around the subclavian artery, which includes the locations of the dorsal and ventral subclavian ansae. For another example, the ablation can be at an expected location of the subclavian ansae. For example, the longitudinal and/or radial position of the neuromodulation element may be visualized (e.g., using fluoroscopy, ultrasound, etc.) and electrodes may be selected for the ablation energy. For example, the longitudinal and/or radial position of the neuromodulation element that has electrodes selectively positioned to correspond to expected subclavian ansae positions may be visualized (e.g., using fluoroscopy, ultrasound, etc.) and all of the electrodes may be selected for the ablation energy. Stimulation may be only after ablation to verify the effect of the ablation.

Pharmacological Therapies

In several embodiments, the neuromodulation therapies described herein can be used to replace pharmacological (drug) therapies. In other embodiments, however, drug therapies may be used in combination with the neuromodulation therapies described herein, but with reduced frequency or dose, thus reducing undesired side effects. For example, a certain drug (or drug combination) may be administered for a shorter overall duration, fewer times per day/week/month, and/or at a lower dose when combined with the neuromodulation described herein. In addition to reducing undesired pharmacological side effects, this may also reduce addiction or dependence. The neuromodulation described herein may also be used to taper or otherwise wean subjects off of pain and other medications.

Certain experiments are described with respect to application of medicaments, for example to induce certain physiological conditions before, during, and/or after stimulation and/or ablation. The devices and methods described herein can be used without medicaments (e.g., without medicaments inducing certain physiological conditions). Anesthetics and other medicaments that enable electrode contact placement, for example, may be used. Substances released by the subject in response to stimulation (e.g., calcitonin gene-related peptide (CGRP)) would not be considered a medicament.

The foregoing description and examples are set forth merely to illustrate the inventive concepts and are not intended as being limiting. Each of the disclosed aspects and examples of the present disclosure may be considered individually or in combination with other aspects, examples, and variations of the disclosure. In addition, unless otherwise specified, none of the steps of the methods of the present disclosure are confined to any particular order of performance. Reasonable modifications of the disclosed examples incorporating the spirit and substance of the disclosure are within the scope of the present disclosure. Furthermore, all references cited herein are incorporated by reference in their entirety. Headings used herein are for organizational purposes only and should not be used to unduly limit claim scope or embodiments.

While the methods and devices described herein may be susceptible to various modifications and alternative forms, specific examples thereof have been shown in the drawings and are herein described in detail. It should be understood, however, that the embodiments are not to be limited to the particular devices or methods disclosed, but, to the contrary, cover all reasonable modifications, equivalents, and alternatives falling within the spirit and scope of the various examples described and the appended claims. Further, the disclosure herein of any particular feature, aspect, method, property, characteristic, quality, attribute, element, or the like in connection with an example can be used in all other examples set forth herein. Any methods disclosed herein need not be performed in the order recited. Depending on the example, one or more acts, events, or functions of any of the algorithms, methods, or processes described herein can be performed in a different sequence, can be added, merged, or left out altogether (e.g., not all described acts or events are necessary for the practice of the algorithm). Algorithms, modules, blocks, steps, boxes, elements, features, etc. may be stored in machine-readable memory. In some examples, acts or events can be performed concurrently, e.g., through multi-threaded processing, interrupt processing, or multiple processors or processor cores or on other parallel architectures, rather than sequentially. Further, no element, feature, block, box, or step, or group of elements, features, blocks, boxes, or steps, are necessary or indispensable to each example. Additionally, all possible combinations, subcombinations, and rearrangements of systems, methods, features, elements, modules, blocks, boxes, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some examples may be performed using the sequence of operations described herein, while other examples may be performed following a different sequence of operations.

The various illustrative logical blocks, boxes, modules, processes, methods, and algorithms described in connection with the examples disclosed herein can be implemented as electronic hardware, computer software, or combinations of both. To clearly illustrate this interchangeability of hardware and software, various illustrative components, blocks, modules, operations, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the examples disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The blocks, operations, or steps of a method, process, or algorithm described in connection with the examples disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, an optical disc (e.g., CD-ROM or DVD), or any other form of volatile or non-volatile computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that some examples include, while other examples do not include, certain features, elements, and/or states. Thus, such conditional language is not generally intended to imply that features, elements, blocks, and/or states are in any way required for one or more examples or that one or more examples necessarily include logic for deciding, with or without author input or prompting, whether these features, elements and/or states are included or are to be performed in any particular example.

The methods disclosed herein may include certain actions taken by a practitioner; however, the methods can also include any third-party instruction of those actions, either expressly or by implication. For example, actions such as "stimulating a nerve" include "instructing stimulation of a nerve."

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 mm" includes "1 mm." Phrases preceded by a term such as "substantially" include the recited phrase and should be interpreted based on the circumstances (e.g., as much as reasonably possible under the circumstances). For example, "substantially parallel" includes "parallel." Unless stated otherwise, all measurements are at standard conditions including temperature and pressure. The phrase "at least one of" is intended to require at least one item from the subsequent listing, not one type of each item in the subsequent listing. For example, "at least one of A, B, and C" can include A, B, C, A and B, A and C, B and C, or A, B, and C.

Unless otherwise defined, all technical terms used herein have the same meaning as commonly understood by one of ordinary skill in the art to which the present disclosure pertains. As used herein, the singular forms "a," "an," and "the" can also include the plural forms, unless the context clearly indicates otherwise. As used herein, the terms "comprises" and/or "comprising," can specify the presence of stated features, steps, operations, elements, components, and/or groups, but do not preclude the presence or addition of one or more other features, steps, operations, elements, components, and/or groups. As used herein, the term "and/or" can include any and all combinations of one or more of the associated listed items. As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "neuromodulation" can refer to an electrical signal delivered as a therapy to neural tissue. In some instances, the neural tissue can include at least a portion of the sympathetic chain. For example, the sympathetic chain can refer to the lumbar sympathetic chain. As used herein, the term "sympathetic nervous system" can refer to a portion of the autonomic nervous system that activates the "Fight or Flight" response (generally accelerating heart rate, dilating pupils, dilating bronchioles, inhibiting digestion, constricting blood vessels, increasing cardiac output, and raising blood pressure, etc.), which prepares the body for intense physical activity. As used herein, the term "electrical signal" can refer to a time-varying voltage or current. As an example, the electrical signal can be represented by a waveform (a graphical representation of changes in current or voltage over time). As used herein, the term "electrode contact" can refer to a material acting as a conductor through which electricity enters or leaves. At least a portion of the material can be a biocompatible material. As used herein, the terms "subject" and "patient" can be used interchangeably and refer to any warm-blooded organism including, but not limited to, a human being, a pig, a rat, a mouse, a dog, a cat, a goat, a sheep, a horse, a monkey, an ape, a rabbit, a cow, etc.

What is claimed is:

1. A method of treating heart disease in a subject, the method comprising:
   percutaneously introducing a catheter into vasculature of the subject, wherein the catheter comprises a neuromodulation element;
   positioning the neuromodulation element in a left subclavian artery of the subject;
   electrically stimulating a left dorsal subclavian ansae;
   confirming stimulation of the left dorsal subclavian ansae by monitoring a first cardiac parameter;
   after confirming stimulation of the left dorsal subclavian ansae, providing ablation energy to the left dorsal subclavian ansae;
   electrically stimulating a left ventral subclavian ansae;
   confirming stimulation of the left ventral subclavian ansae by monitoring a second cardiac parameter;
   after confirming stimulation of the left ventral subclavian ansae, providing ablation energy to the left ventral subclavian ansae;
   positioning the neuromodulation element in a right subclavian artery of the subject;
   electrically stimulating a right dorsal subclavian ansae;
   confirming stimulation of the right dorsal subclavian ansae by monitoring a third cardiac parameter;
   after confirming stimulation of the right dorsal subclavian ansae, providing ablation energy to the right dorsal subclavian ansae;
   electrically stimulating a right ventral subclavian ansae;
   confirming stimulation of the right ventral subclavian ansae by monitoring a fourth cardiac parameter; and
   after confirming stimulation of the right ventral subclavian ansae, providing ablation energy to the right ventral subclavian ansae.

2. The method of claim 1, wherein the first cardiac parameter is different than at least one of the second cardiac parameter, the third cardiac parameter, or the fourth cardiac parameter.

3. The method of claim 1, wherein the first cardiac parameter is the same as at least one of the second cardiac parameter, the third cardiac parameter, or the fourth cardiac parameter.

4. The method of claim 1, wherein at least one of the first cardiac parameter, the second cardiac parameter, the third cardiac parameter, or the fourth cardiac parameter comprises at least one of arterial trace blood pressure change, whether AF is induced, whether arrhythmia is induced, whether a change in cardiac cycle length is induced, repeat restitution curve, right atrial ERP, left atrial ERP, dERP, heart rate, IACT, or unipolar electrogram from multipolar catheter under steady state RV pacing or with short DI after steady state RV pacing.

5. The method of claim 1, further comprising, after providing ablation energy, restimulating the subclavian ansae and, if a cardiac parameter confirms stimulation, providing further ablation energy to the subclavian ansae.

6. The method of claim 5, comprising repeating the restimulating and providing further ablation energy until the cardiac parameter does not confirm stimulation.

7. The method of claim 1, wherein the catheter includes an expansion element on which the neuromodulation element is positioned.

8. A method of treating heart disease in a subject, the method comprising:
   percutaneously introducing a catheter into vasculature of the subject, wherein the catheter comprises a neuromodulation element;
   positioning the neuromodulation element in a subclavian artery of the subject;
   electrically stimulating a dorsal subclavian ansae;
   confirming stimulation of the dorsal subclavian ansae by monitoring a first cardiac parameter;
   after confirming stimulation of the dorsal subclavian ansae, providing ablation energy to the dorsal subclavian ansae;
   electrically stimulating a ventral subclavian ansae;
   confirming stimulation of the ventral subclavian ansae by monitoring a second cardiac parameter; and
   after confirming stimulation of the ventral subclavian ansae, providing ablation energy to the ventral subclavian ansae.

9. The method of claim 8 wherein the first cardiac parameter is different than the second cardiac parameter.

10. The method of claim 8, wherein the first cardiac parameter is the same as the second cardiac parameter.

11. The method of claim 8, wherein at least one of the first cardiac parameter or the second cardiac parameter comprises at least one of arterial trace blood pressure change, whether AF is induced, whether arrhythmia is induced, whether a change in cardiac cycle length is induced, repeat restitution curve, right atrial ERP, left atrial ERP, dERP, heart rate, IACT, or unipolar electrogram from multipolar catheter under steady state RV pacing or with short DI after steady state RV pacing.

12. The method of claim 8 further comprising, after providing ablation energy, restimulating the subclavian ansae and, if a cardiac parameter confirms stimulation, providing further ablation energy to the subclavian ansae.

13. The method of claim 12, comprising repeating the restimulating and providing further ablation energy until the cardiac parameter does not confirm stimulation.

\* \* \* \* \*